US012650818B2

(12) United States Patent
Kehres

(10) Patent No.: US 12,650,818 B2
(45) Date of Patent: Jun. 9, 2026

(54) METHODS AND SYSTEMS FOR CONSTRUCTION OF WORKFLOW AUTOMATION USING ARTIFICIAL INTELLIGENCE

(71) Applicant: Shopify Inc., Ottawa (CA)

(72) Inventor: Richard Jeffrey Kehres, Waterloo (CA)

(73) Assignee: Shopify Inc., Ottawa (CA)

( * ) Notice: Subject to any disclaimer, the term of this patent is extended or adjusted under 35 U.S.C. 154(b) by 290 days.

(21) Appl. No.: 18/587,784

(22) Filed: Feb. 26, 2024

(65) Prior Publication Data

US 2025/0272062 A1    Aug. 28, 2025

(51) Int. Cl.
| | |
|---|---|
| *G06F 9/54* | (2006.01) |
| *G06F 8/30* | (2018.01) |
| *G06F 8/33* | (2018.01) |
| *G06F 8/34* | (2018.01) |
| *G06F 8/70* | (2018.01) |
| *G06F 9/44* | (2018.01) |
| *G06Q 10/00* | (2026.01) |
| *H04L 67/60* | (2022.01) |

(52) U.S. Cl.
CPC . *G06F 8/33* (2013.01); *G06F 8/70* (2013.01)

(58) Field of Classification Search
CPC .......... G06F 8/70; G06F 8/33; G06F 16/3329; G06F 9/44526; G06F 8/10; G06F 8/73; G06F 40/40; G06F 9/5038; G06F 40/226; G06F 9/451; G06F 9/543; G06N 3/0455; G06N 3/08; B25J 9/163; G06Q 10/10; G05B 19/4155
See application file for complete search history.

(56) References Cited

U.S. PATENT DOCUMENTS

| | | | | | |
|---|---|---|---|---|---|
| 8,656,346 | B2 * | 2/2014 | Kodi | ................... | G06F 9/45512 |
| | | | | | 717/106 |
| 11,706,314 | B2 * | 7/2023 | Bedi | ..................... | G06F 9/5072 |
| | | | | | 709/217 |

* cited by examiner

*Primary Examiner* — Thuy Dao

(74) *Attorney, Agent, or Firm* — Foley & Lardner LLP

(57) ABSTRACT

Disclosed herein are methods and systems to generate code for a workflow. A non-limiting example of a method comprises executing, by a processor, a large language model, which receives an input of an intent associated with a workflow and provides a machine-readable description by: identifying, by searching a hierarchical data structure using a vector embedding associated with the intent, an object corresponding to the intent; identifying a set of data paths within the hierarchical data structure to retrieve the identified object; and generating the machine-readable description, the machine-readable description describing the object and at least one data path within the set of data paths; and generating, by the processor, code for the workflow using the machine-readable description.

20 Claims, 14 Drawing Sheets

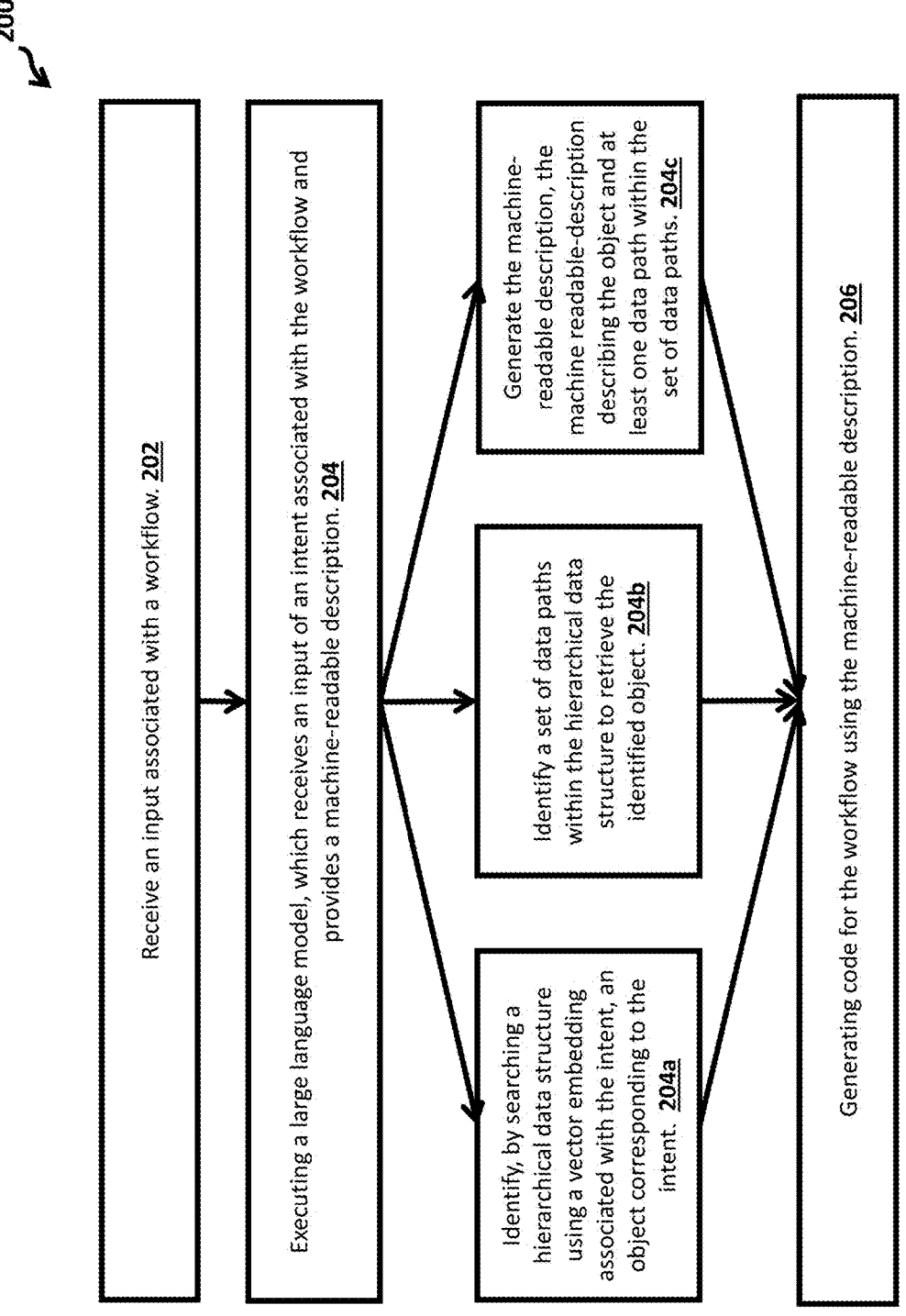

200

Receive an input associated with a workflow. 202

Executing a large language model, which receives an input of an intent associated with the workflow and provides a machine-readable description. 204

Identify, by searching a hierarchical data structure using a vector embedding associated with the intent, an object corresponding to the intent. 204a Identify a set of data paths within the hierarchical data structure to retrieve the identified object. 204b Generate the machine-readable description, the machine readable-description describing the object and at least one data path within the set of data paths. 204c Generating code for the workflow using the machine-readable description. 206

FIG. 2

Receive an order from a user 450

Analyze user data 452

Analyze transaction data 454

Determine the user's location based on the user data and transaction data 456

Figure 5A:
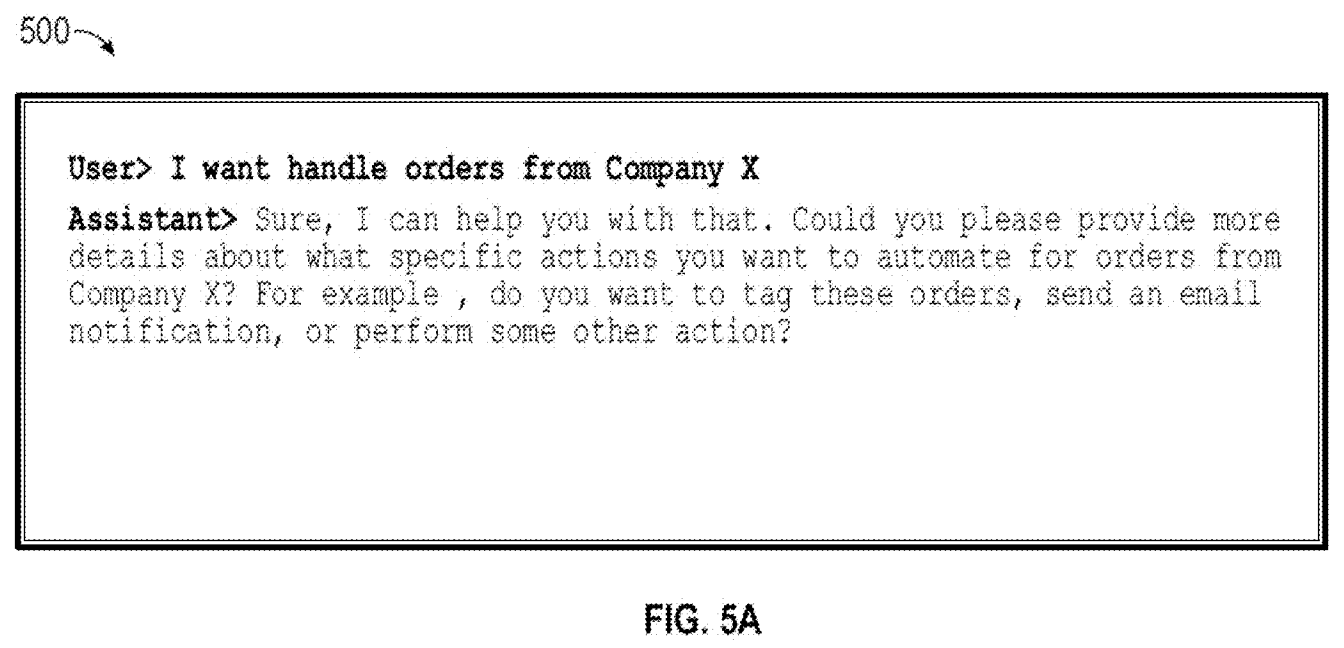

User> I want handle orders from Company X

Assistant> Sure, I can help you with that. Could you please provide more details about what specific actions you want to automate for orders from Company X? For example, do you want to tag these orders, send an email notification, or perform some other action?

Figure 5B:
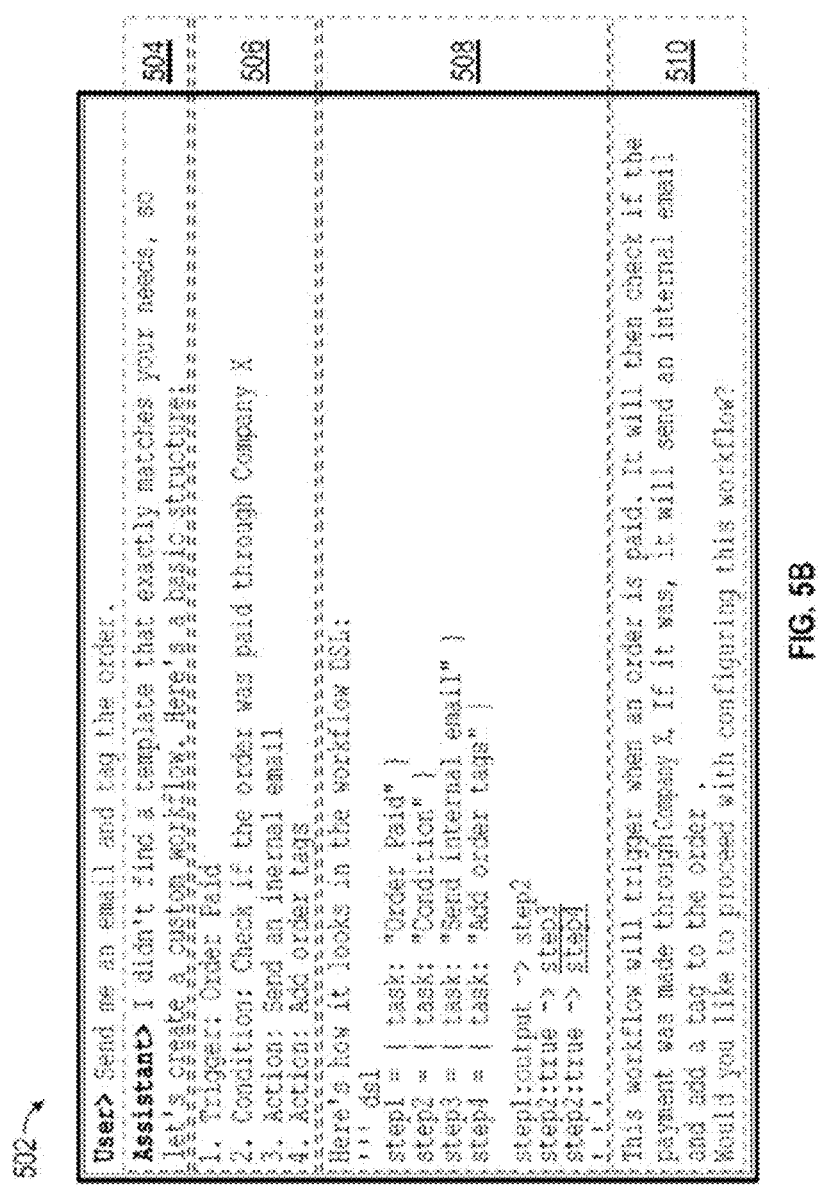

User> Send me an email and tag the order.

Assistant> I didn't find a template that exactly matches your needs, so let's create a custom workflow. Here's a basic structure: — 504

1. Trigger: Order Paid
2. Condition: Check if the order was paid through Company X
3. Action: Send an internal email
4. Action: Add order tags

— 506

Here's how it looks in the workflow DSL: — 508

```
... dsl
step1 = | task: "Order Paid" )
step2 = | task: "Condition" )
step3 = | task: "Send internal email1" )
step4 = | task: "Add order tags" )

step1:output -> step2
step2:true -> step3
step2:true -> step4
...l.
```

This workflow will trigger when an order is paid. It will then check if the payment was made through Company X. If it was, it will send an internal email and add a tag to the order.
Would you like to proceed with configuring this workflow? — 510

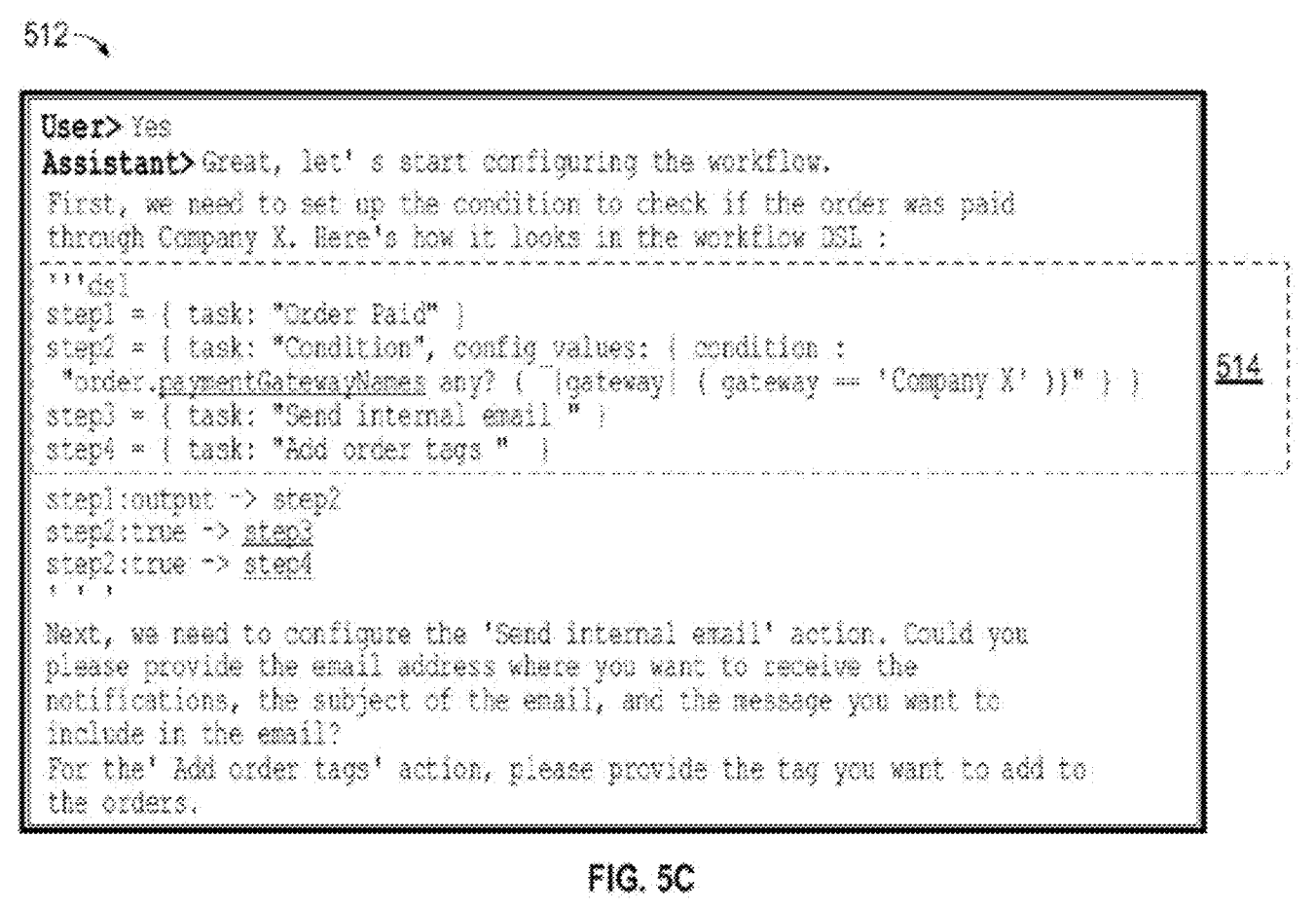

```
User> Yes
Assistant> Great, let's start configuring the workflow.

First, we need to set up the condition to check if the order was paid
through Company X. Here's how it looks in the workflow DSL :

```dsl
step1 = { task: "Order Paid" }
step2 = { task: "Condition", config values: [ condition :
"order.paymentGateway"Name say? ( _[gateway] (gateway == 'Company X' )}" ]
step3 = { task: "Send internal email" }
step4 = { task: "Add order tags " ]

step1(output -> step2
step2:true -> step3
step2:true -> step4
`
```

Next, we need to configure the 'Send internal email' action. Could you
please provide the email address where you want to receive the
notifications, the subject of the email, and the message you want to
include in the email?
For the 'Add order tags' action, please provide the tag you want to add to
the orders.
```

FIG. 5C

METHODS AND SYSTEMS FOR CONSTRUCTION OF WORKFLOW AUTOMATION USING ARTIFICIAL INTELLIGENCE

TECHNICAL FIELD

This application generally relates to using artificial intelligence modeling techniques for code construction.

BACKGROUND

Many organizations provide no/low code workflow builders that may include a visual interface where users can generate a data pipeline using graphical representations of different functions and processes (e.g., triggers, actions, conditions, or data manipulations) as different steps or blocks of the workflow. Users are generally able to visually manipulate (e.g., connect or direct the flow of) different blocks such that the visual interface depicts their desired workflow. A processor may then generate the actual code that replicates the visual workflow's path(s) and functionality.

BRIEF DESCRIPTION OF THE DRAWINGS

The accompanying drawings constitute a part of this specification and illustrate embodiments of the subject matter disclosed herein.

FIG. 2 shows execution steps for an AI-assisted workflow construction system, according to an embodiment.

FIGS. 5A-C show various user interfaces provided in an AI-assisted workflow construction system, according to an embodiment.

DETAILED DESCRIPTION

Figure 1:
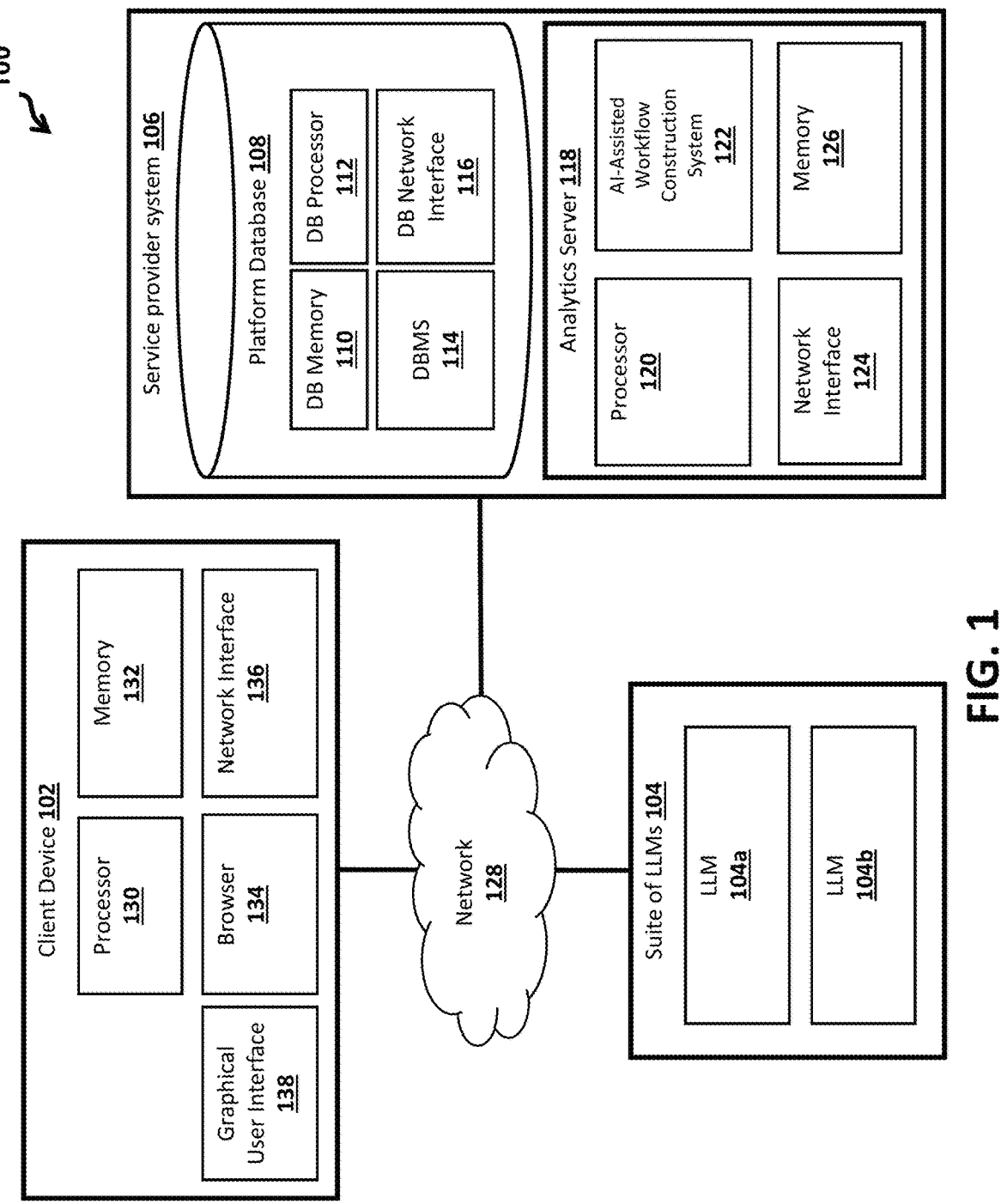
FIG. 1 shows components of an artificial intelligence-assisted (AI-assisted) workflow construction system, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used, and/or other changes may be made without departing from the spirit or scope of the present disclosure. The illustrative embodiments described in the detailed description are not meant to be limiting of the subject matter presented here.

Existing and conventional no/low workflow builders are typically inefficient for the generation of more complex workflows that often involve conditional steps and multiple dependencies (e.g., steps that depend on multiple other steps with their own respective conditions). Typically, constructing conditional steps within a workflow requires navigating a hierarchal tree of objects. This endeavor can be technologically cumbersome for a user who is unfamiliar with coding (e.g., the API documentation) or system architecture (e.g., does not know the names of the objects containing the data upon which to base the conditional).

Moreover, users may not be code-savvy enough to readily identify objects and data paths needed for the efficient operation of the workflow. Using the methods and systems discussed herein, a user may provide a natural language description of their desired workflow. Using a suite of large language models (LLMs), a software product (an artificial intelligence (AI) workflow assistant) can generate a machine-readable representation of the desired workflow such that the actual code can be created accordingly. The AI workflow assistant hosted/provided by an analytics server can bifurcate the workload among two distinct (and sometimes disparate) LLMs to identify objects needed to generate the workflow and then generate a list of candidate paths needed to retrieve data associated with the identified objects. The AI workflow assistant can either generate the code associated with the desired workflow or transmit the machine-readable language to another module or server along with instructions to generate the workflow code.

Example Networked Components of an AI-Assisted Workflow Construction System

FIG. 1 illustrates components of a system 100, according to an embodiment. The system 100 may include a client device 102, a suite of LLMs 104, a service provider system 106, and a network 128. The depicted system 100 is described and shown in FIG. 1 as having one of each component for ease of description and understanding of the example. The embodiments may include any number of the components described herein. The embodiments may comprise additional or alternative components or may omit certain components and still fall within the scope of this disclosure. In some embodiments, the client device 102 and/or the service provider system 106 may be the same as or similar to (e.g., include one or more components of) the example computing system depicted and discussed in FIG. 7. It will be understood that components included in different systems illustrated by FIG. 1 that are referred to using the same or similar reference numbers (for ease of reference) may be the same as, or similar to, one another when included in separate devices.

In some implementations, the client device 102 is associated with an individual such as a user, a customer, a device owner, an account owner, an individual associated with a merchant, and/or the like that, for example, is requesting assistance with the generation of a workflow. In examples where the user is a merchant, a device owner, an account owner, and/or the like, the user may interact with the client device 102 by providing input that is then communicated to the analytics server 118, which then communicates with the suite of LLMs 104.

The network 128 may include any number of networks, which may be public or private networks. The network 128 may comprise hardware and software components implementing various network and/or telecommunications protocols facilitating communications between various devices, which may include devices of the system 100 or any number of additional or alternative devices not shown in FIG. 1. The network 128 may be implemented as a cellular network, a Wi-Fi network (or other wired or wireless local area network (LAN)), a WiMAX network (or other wired or wireless wide area network (WAN)), and the like.

The client device 102 may be any computing system comprising hardware and software components capable of performing the various tasks and processes described herein. Non-limiting examples of the client device 102 may include mobile phones, tablets, smartwatches, display devices that use augmented reality (AR) or virtual reality (VR) technology, laptops, and personal computers, among others. It will be understood that in some embodiments, the client device 102 may be the same type of device, and, as such, similarly numbered features are described with respect to the same reference numeral for each device.

When communicating with components of the service provider system 106, the client device 102 may generate and transmit data (e.g., input data described with respect to FIG. 4) that is processed by or otherwise accessible to the analytics server 118 of the service provider system 106. The web traffic (communicated via the network interface 124) may comprise data packets that include various types of data that can be parsed, analyzed, or otherwise reviewed by various programmatic algorithms of the analytics server 118. For instance, the web traffic data may indicate which website was accessed by a user operating the client device 102 (e.g., whether a user operating the client device 102 has accessed the website or whether the user has interacted with a graphical component of the website such as a component corresponding to a chat session).

The client device 102 may include a processor 130, memory 132, GUI 138, and network interface 136. An example of the GUI 138 is a display screen (which may be a touchscreen), a gesture recognition system, a keyboard, a stylus, and/or a mouse. The network interface 136 is provided for communicating over the network 128. The structure of the network interface 136 will depend on how the client device 102 interfaces with the network 128. For example, if the client device 102 is a mobile phone or tablet, the network interface 136 may include a transmitter/receiver with an antenna to send and receive wireless transmissions to/from the network 128.

The client device 102 may be connected to the network 128 with a network cable. The network interface 136 may include, for example, a network interface card (NIC), a computer port, and/or a network socket. The processor 130 directly performs or instructs all of the operations performed by the client device 102. Non-limiting examples of these operations include processing customer inputs received from the GUI 138, preparing information for transmission over the network 128, processing data received over the network 128, and instructing a display screen to display information. The processor 130 may be implemented by one or more processors that execute instructions stored in the memory 132. Alternatively, some or all of the processor 130 may be implemented using dedicated circuitry, such as an ASIC, a GPU, or a programmed FPGA.

The service provider system 106 may be a computing system infrastructure that is associated with (e.g., owned, managed, and/or hosted) by an e-commerce service, though this need not be the case. The service provider system 106 includes electronic hardware and software components capable of performing various processes, tasks, and functions of the service provider system 106. For instance, the computing infrastructure of the service provider system 106 may comprise one or more platform networks (not explicitly shown) interconnecting the components of the service provider system 106. The platform networks may comprise one or more public and/or private networks and include any number of hardware and/or software components capable of hosting and managing the networked communication among devices of the service provider system 106.

The components of the service provider system 106 include the analytics server 118 and a platform database 108. However, the embodiments may include additional or alternative components capable of performing the operations described herein. In some implementations, certain components of the service provider system 106 may be embodied in separate computing devices that are interconnected via one or more public and/or private internal networks (e.g., network 128). In some implementations, certain components of the service provider system 106 may be integrated into a single device. For instance, the analytics server 118 may host the platform database 108.

The analytics server 118 may be any computing device that comprises a processor 120 with non-transitory machine-readable storage media (e.g., memory 126) and that is capable of executing the software for one or more functions, such as the AI-assisted workflow construction system 122. In some cases, the server memory 126 may store or otherwise contain computer-executable software instructions, such as instructions needed to execute the AI-assisted workflow construction system 122. The software and hardware components of the analytics server 118 enable it to perform various operations that serve particular functions of the service provider system 106. In some embodiments, the analytics server 118 may be configured to serve various functions of the service provider system 106. Non-limiting examples of such functions may include web servers hosting webpages (or at least a portion of a webpage, such as those used to facilitate communication between customers using a client device 102 and the analytics server 118.

The service provider system 106 is shown and described as having only one analytics server 118 performing each of the various functions of the e-commerce service. For instance, the analytics server 118 is described as serving the functions of an AI-assisted workflow construction system 122. It is intended that FIG. 1 be merely illustrative and that embodiments are not limited to the description of the system 100 or the particular configuration shown in FIG. 1. The software and hardware of the analytics server 118 may be integrated into a single distinct physical device (e.g., a single analytics server 118) or may be distributed across multiple devices (e.g., multiple analytics servers 118).

The platform database 108 stores and manages data (e.g., data records) concerning various aspects of the service provider system 106, including information about, for example, customers and/or agents; the data may further include the data generated or captured during one or more chat sessions (e.g., user input data as described with respect to FIGS. 6A-B and 7), from the suite of LLMs 104.

The platform database 108 may also include various libraries and data tables, including detailed data needed to perform the methods described herein. In another example, the analytics server 118 may generate a data table associated with (e.g., including) data generated during a chat session involving the client device 102. The platform database 108 may also include a user profile that includes all data associated with a user account (e.g., the user operating the client device 102). The user profile may include data associated with customer input data generated during earlier-conducted chat sessions and corresponding agent input data generated during the earlier-conducted chat sessions.

The platform database 108 may be hosted on any number of computing devices having a processor (sometimes referred to as a database (DB) processor 112) and non-transitory machine-readable memory configured to operate as a DB memory 110 and capable of performing the various processes and tasks described herein. For example, one or more analytics servers 118 may host some or all aspects of the platform database 108.

A computing device hosting the platform database 108 may include and execute database management system (DBMS) 114 software, though a DBMS 114 is not required in every potential embodiment. The platform database 108 can be a single, integrated database structure or may be distributed into any number of database structures that are configured for some particular types of data needed by the service provider system 106. For example, a first database could store data associated with one or more chat sessions involving one or more customers and/or one or more agents, a second database could store user credentials to later be accessed for authentication purposes, and a third database could store raw or compiled machine-readable software code (e.g., HTML, JavaScript) for webpages such that the DB memory 110 is configured to store information for hosting webpages.

The computing device hosting the platform database 108 may further include a DB network interface 116 for communicating via platform networks of the service provider system 106. The structure of the DB network interface 116 will depend on how the hardware of the platform database 108 interfaces with other components of the service provider system 106. For example, the platform database 108 may be connected to the platform network with a network cable. The DB network interface 116 may include, for example, a NIC, a computer port, and/or a network socket. The database processor 112 directly performs or instructs all of the operations performed by the platform database 108.

Non-limiting examples of such operations may include processing data communicated between (e.g., transmitted and/or received by) the client device 102 and/or the analytics server 118 (e.g., using the browser 134) and preparing data for transmission via the platform network and/or the external networks. The database processor 112 may be implemented by one or more processors that execute instructions stored in the DB memory 110 or other non-transitory storage medium. Alternatively, some or all of the DB processor 112 may be implemented using dedicated circuitry such as an ASIC, a GPU, or a programmed FPGA.

The DB memory 110 of the platform database 108 may contain data records related to, for example, user activity and various information and metrics derived from web traffic involving user accounts. The data may be accessible to the analytics server 118. The analytics server 118 may issue queries to the platform database 108 and data updates based upon, for example, earlier-conducted chat sessions.

The suite of LLMs 104 may include two or more LLMs (104a-104b). An LLM, as used herein, may refer to AI models that specialize in processing, understanding, and generating natural language, such as a user inputting natural language via the client device 102. The LLMs within the suite of LLMs 104 may be pre-trained on corpus corresponding to vast amounts of text data, which enables the LLMs to learn complex patterns of language use and a wide variety of information. The suite of LLMs 104 may include two or more LLMs. Therefore, the depiction of two LLMs is not limiting to the methods and systems discussed herein. Moreover, in some embodiments, a single LLM may perform the actions described in relation to different LLMs, as discussed herein. Therefore, in some embodiments, a suite of sub-models (within a single LLM) may be substituted with the different LLMs discussed herein.

Example Methods for AI-Assisted Workflow Construction

FIG. 2 illustrates a flowchart depicting operational steps for an AI-assisted workflow construction in accordance with an embodiment. The method 200 describes how an AI-assisted workflow construction system (e.g., various hardware and software computing components that are the same as, or similar to, the AI-assisted workflow construction system 122 that is implemented by the analytics server 118 described in FIG. 1) can monitor one or more electronic communications with a user (e.g., performing various analytics on the communications content or data by executing one or more LLMs on the electronic communications) and generate machine-readable descriptions of a workflow.

Even though the method 200 is described as being executed by the analytics server, the method 200 can be executed by any server and/or locally (e.g., by a client device 102 described in FIG. 1). Additionally, or alternatively, the method 200 may be implemented in other computer environments (e.g., other than the environments depicted in FIG. 1). Furthermore, other configurations of the method 200 may comprise additional or alternative steps or may omit one or more steps altogether. Without limiting the principles described herein, in an illustrative example, client devices described herein may be associated with users that are engaging with the client devices to provide input (e.g., questions and/or comments during a chat session) associated with a workflow.

At step 202, the analytics server may receive an input associated with a workflow. The analytics server may receive input data from a user (e.g., a merchant). In some embodiments, the input data may be received from a client device during a chat session. For example, the analytics server may receive the input data based on a user (e.g., an individual or a script generated automatically) providing input via a client device. The input may represent a string of text and/or other inputs (e.g., audio input) provided via an input device associated with the client device, e.g., a keyboard or a microphone. In some embodiments, a user may access a platform using a chat interface and provide a description of a workflow. In other examples, the merchant may use a variety of input elements (e.g., radio buttons or drop-down menus) to input one or more attributes of the workflow.

The input received, as discussed herein, may indicate how the user desires a workflow to operate. For instance, the user may input a desired functionality of the workflow. The functionality may be the functionality for the entire workflow and/or specific to a particular block or step of the workflow.

The interactions between the client device operated by the user and the analytics server may be facilitated by a platform provided by the AI workflow assistant platform/interface or the analytics server, e.g., through a chat interface and/or an API. The AI workflow assistant may also include one or more prompt templates allowing dynamic data insertion and a memory component to utilize previous conversations to guide the merchant into inputting their desired attributes and/or functionality of the workflow.

Figure 3A:
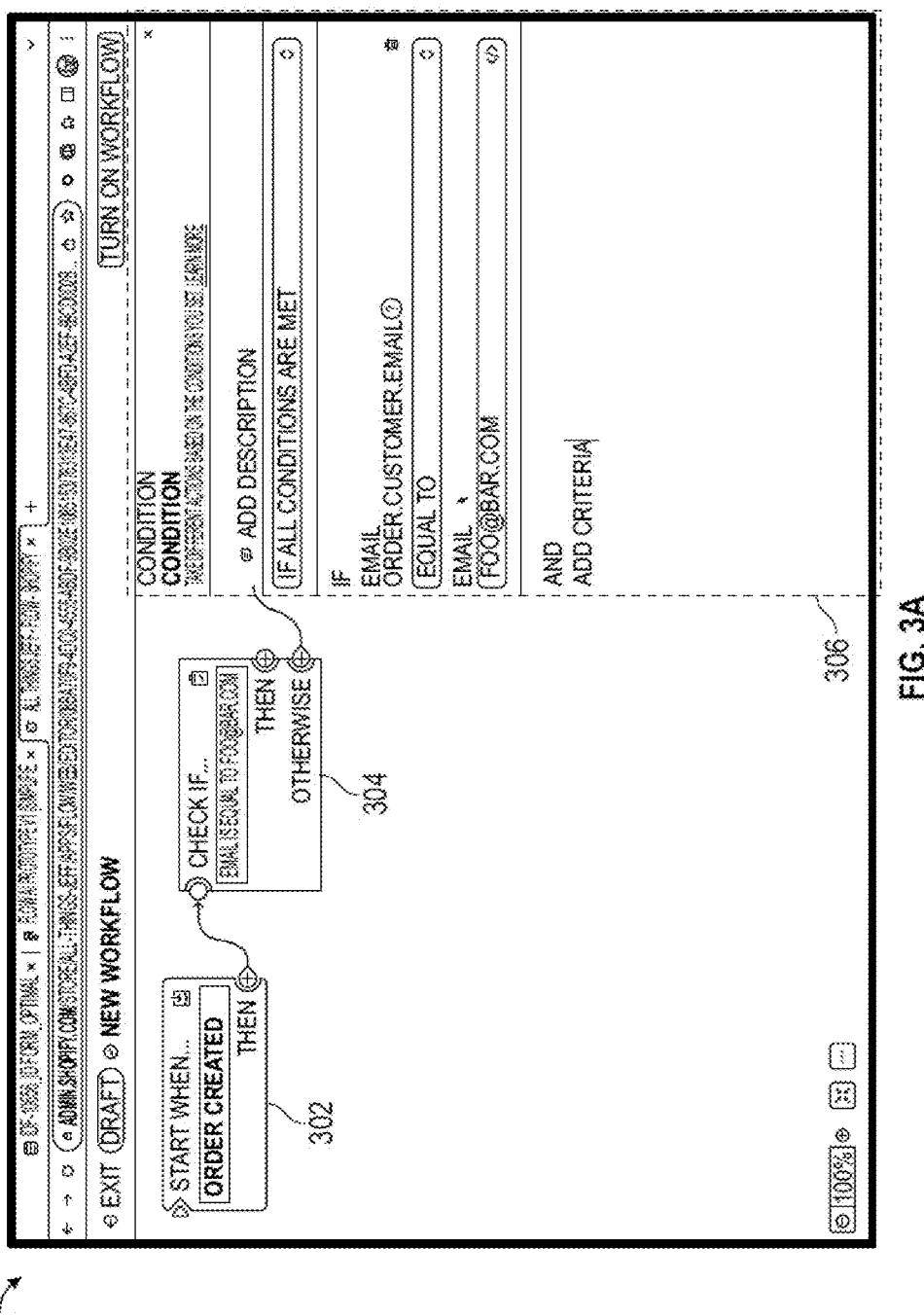
FIGS. 3A-C show various user interfaces provided in an AI-assisted workflow construction system, according to an embodiment.
Figure 3B:
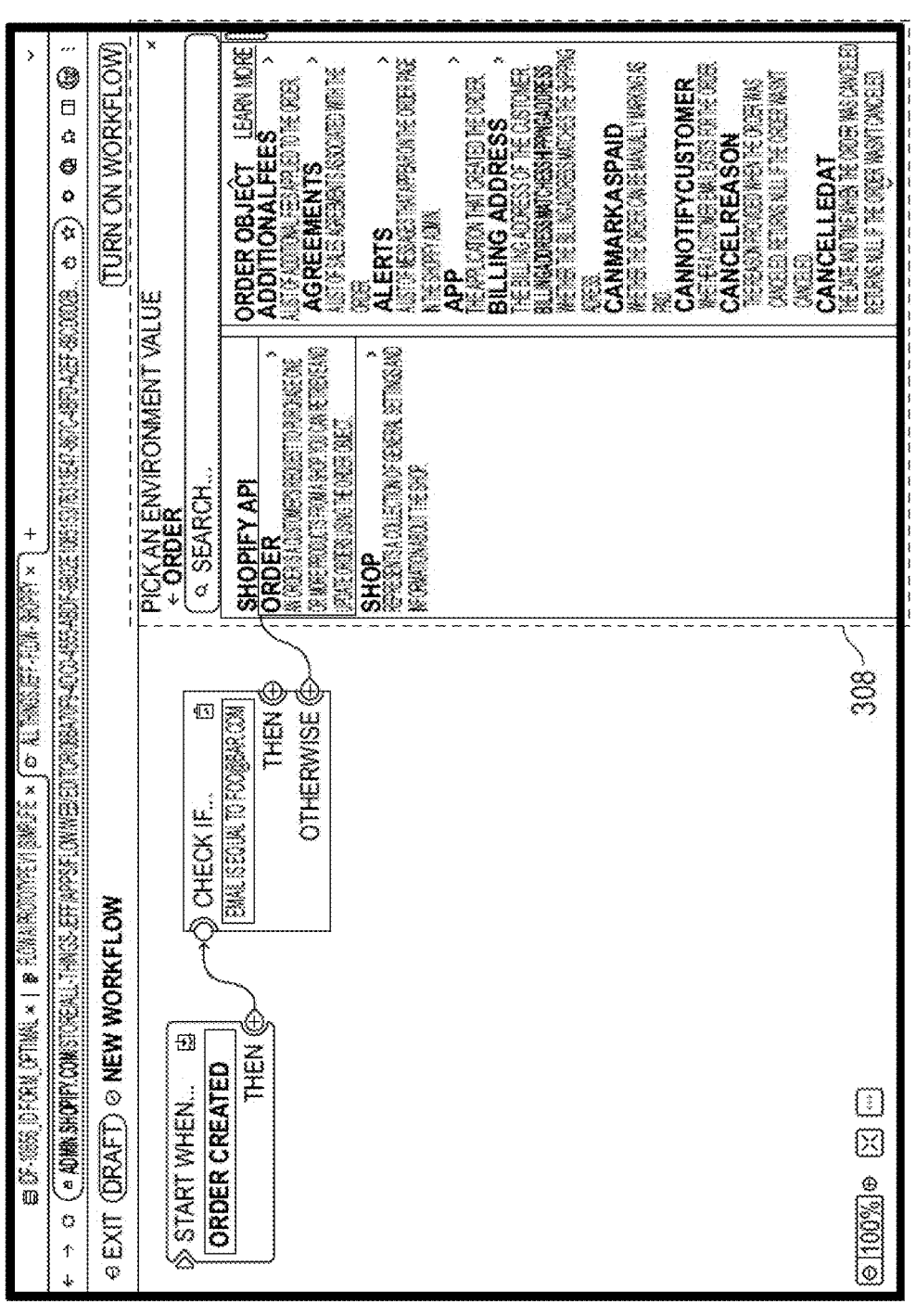
Figure 3C:
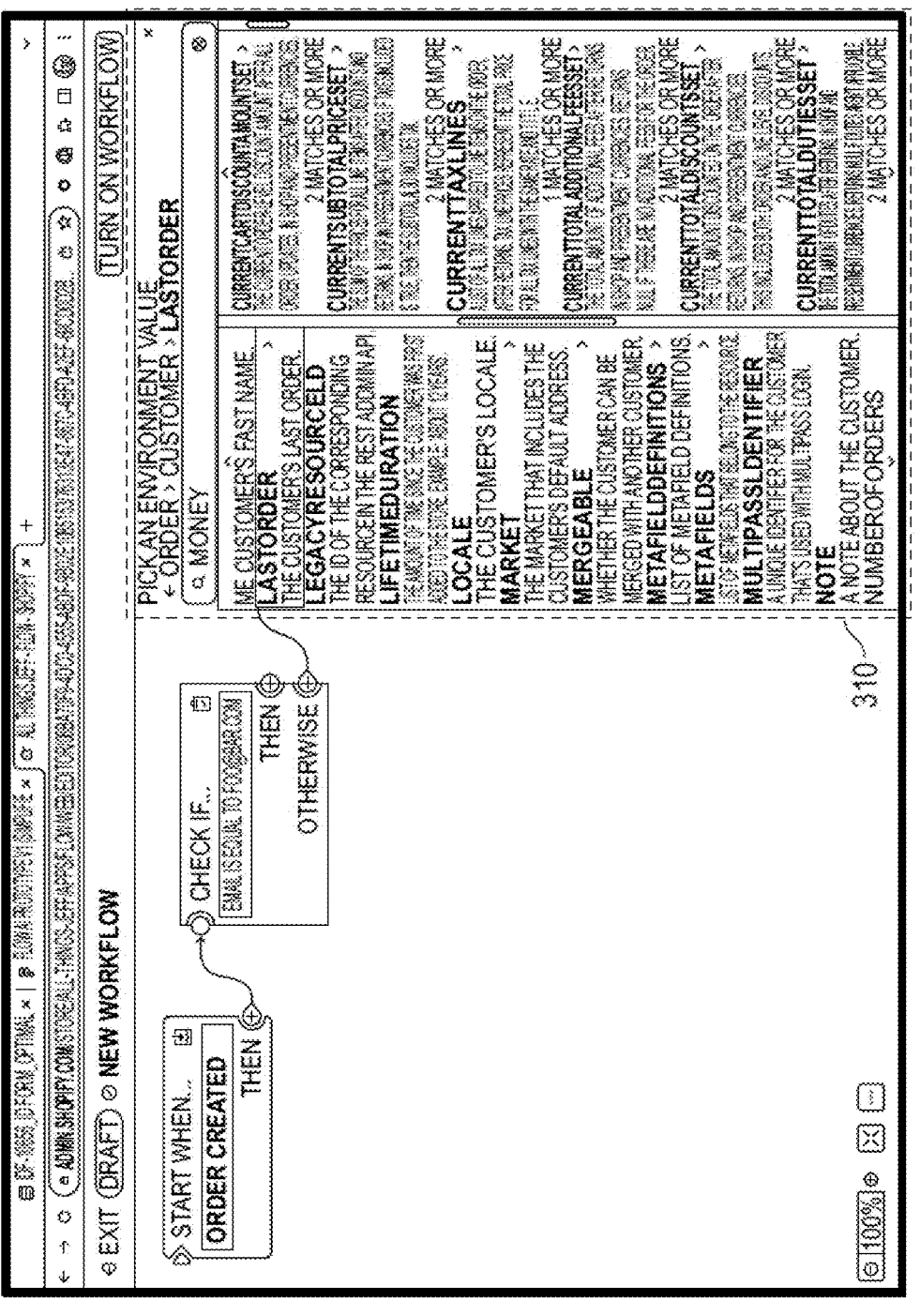

The method 200 may replace conventional methods in which end-users are burdened with identifying data objects. Referring now to FIGS. 3A-3C, a non-limiting example of challenges associated with conventional no-code platforms, is presented. A user may access an electronic platform 300 to generate a workflow. The user may then generate a block 302 representing that a user's website has received an order (e.g., a customer has checked out and placed an order to be fulfilled by the user). The block 302 may represent a first step within the workflow being created by the user. The user may then use various functionalities provided by the electronic platform 300 to connect the block 302 to a subsequent block 304 representing a subsequent step within the desired workflow. In a non-limiting example, the user may connect an arrow from the block 302 to the block 304 indicating that the block 302 is logically connected to the block 304.

The block 304 may visually indicate its conditional nature by presenting an "if" text box, "then" statement that can be connected to a subsequent block, and an "otherwise" statement that can also be connected to a subsequent block.

In some embodiments, when the user interacts with block 304, the analytics server may display the graphical element 306 allowing the user to configure the block. In some embodiments, the user may also use the "otherwise" feature to configure a block's behavior (or the subsequent block's behavior) within a workflow. When the user interacts with the "otherwise" statement, the analytics server may prompt the user to create a subsequent block and receive data indicating how the subsequent block behaves. For instance, when the user interacts with the "otherwise" statement, the analytics server may display the graphical element 306, which includes various input elements, allowing the user to select the parameters of the desired conditional step.

In some embodiments, when the user selects the "otherwise," the user is directed toward a panel allowing the user to select the type of new block to add. If the user selects a condition, then the user is routed to the graphical element 306. Therefore, in some embodiments, the user may never be routed straight from interacting with "otherwise" to 306.

In some embodiments, when the user interacts with "add criteria" within the graphical element 306, the analytics server may direct the merchant to the graphical element 308 (FIG. 3B), where different options to include within the block 304 are presented to the user. The graphical element 308 may display a list of properties of different objects (e.g., customers or orders) to the user. The user can continue drilling down the options until the user identifies the desired granular object or property needed to construct the desired logic (and will then proceed with the block 304). Even though a search feature may be present, in some embodiments, the search feature may return a large number of results or fail to match the user's intent and return poor or no results. Therefore, the user may not be able to generate the block 304 correctly or efficiently. For instance, as depicted in FIG. 3C, the graphical element 310 represents search results for the term "money." As depicted, even using the search feature, the user may not identify the desired object to use (e.g., the name or property of the object to use to identify where the workflow should retrieve the data).

Referring back to FIG. 2, the input received (at step 202) may be analyzed such that the analytics server identifies the intent of the input received from the user. As used herein, the intent of the user may refer to one or more attributes of the workflow as intended to be created by the user.

In some embodiments, the analytics server may use an AI model, such as a large language model (LLM), to analyze the user's natural language input to identify the intent and attributes of the workflow. The analysis may include using the LLM (referred to herein as the first LLM) to generate key terms via conducting language understanding and contextual interpretation using the input received from the user.

The interactions between the user and the analytics server may be facilitated by the first LLM, e.g., through a chat interface/API. The AI-assisted workflow construction may also include a prompt template allowing dynamic data insertion and a memory component.

In some embodiments, the first LLM may be stateless. Therefore, the first LLM may not use a stored memory of a chat session, previous conversations, or other user's conversations. However, in some embodiments, the AI-assisted workflow construction system may be responsible for maintaining this state via a memory component. In some embodiments, the memory component may be configured to store the history of a "current" conversation (e.g., the current chat session) with the user. When the first LLM is called, the AI-assisted workflow construction (e.g., the analytics server) may pass a history of the conversation and/or the user's latest input to the first LLM. This allows the first LLM to generate the next response to the user, in light of the context of the user's current chat session.

Additionally, or alternatively, the memory component may also include prior conversations from the same user or other users. For instance, in some embodiments, the memory component may be used to utilize previous conversations (from other users and/or the individual user, such that the first LLM is customized for the user and/or the subject matter). The first LLM may chat with users to understand the intent associated with the workflow.

In some embodiments, the analytics server may transmit the user's inputs to the first LLM. The first LLM may have been trained on vast datasets of human language and previous conversations regarding different (previously created) workflows. The first LLM may use its training to comprehend the input by the user. For instance, when a user describes a workflow, the first LLM may first parse the input and extract the intent of the input, such as key elements such as tasks, objectives, tools involved, and sequential steps of the workflow. The first LLM may understand the user's intent in light of the meaning of words of the input using the context of the input, thereby identifying the underlying intent, in addition to priorities and expectations associated with the workflow.

In some embodiments, the first LLM can be augmented using specialized algorithms or additional layers of processing that are specific to the user's needs. For instance, the first LLM may use an additional layer that is specially trained for a particular type of workflow and/or particularly trained for the user (e.g., trained using previous conversations and needs of the user).

The first LLM may also conduct sentiment analysis to gauge the user's reactions toward certain aspects of the workflow. For instance, the sentiment analysis may indicate a proclivity toward certain workflow characteristics. Additionally, the first LLM may use contextual understanding to identify the user's intent. This holistic approach allows the analytics server to construct a nuanced understanding of the workflow as described by the user, identifying both the explicit tasks needed for a step of the workflow and the more subtle, implicit aspects of the intent. Therefore, the intent extracted by the first LLM may be a detailed and accurate representation of the workflow.

In some embodiments, the first LLM may generate a preliminary or rudimentary workflow that corresponds to the user's input. For instance, the first LLM may generate a list of steps included within the workflow, such that the desired intent of the user can be satisfied by the progression of the steps. The analytics server may output the rudimentary workflow such that the predicted rudimentary flow can be approved, denied, and/or revised by the user. In some embodiments, the rudimentary workflow may be generated using a domain-specific language, which helps the first or second LLMs use fewer tokens and allows a rendering engine to efficiently turn this outline into a visual form. For instance, the analytics server may display a visual workflow, e.g., the workflow depicted in FIG. 4C, to the user.

Figure 4A:
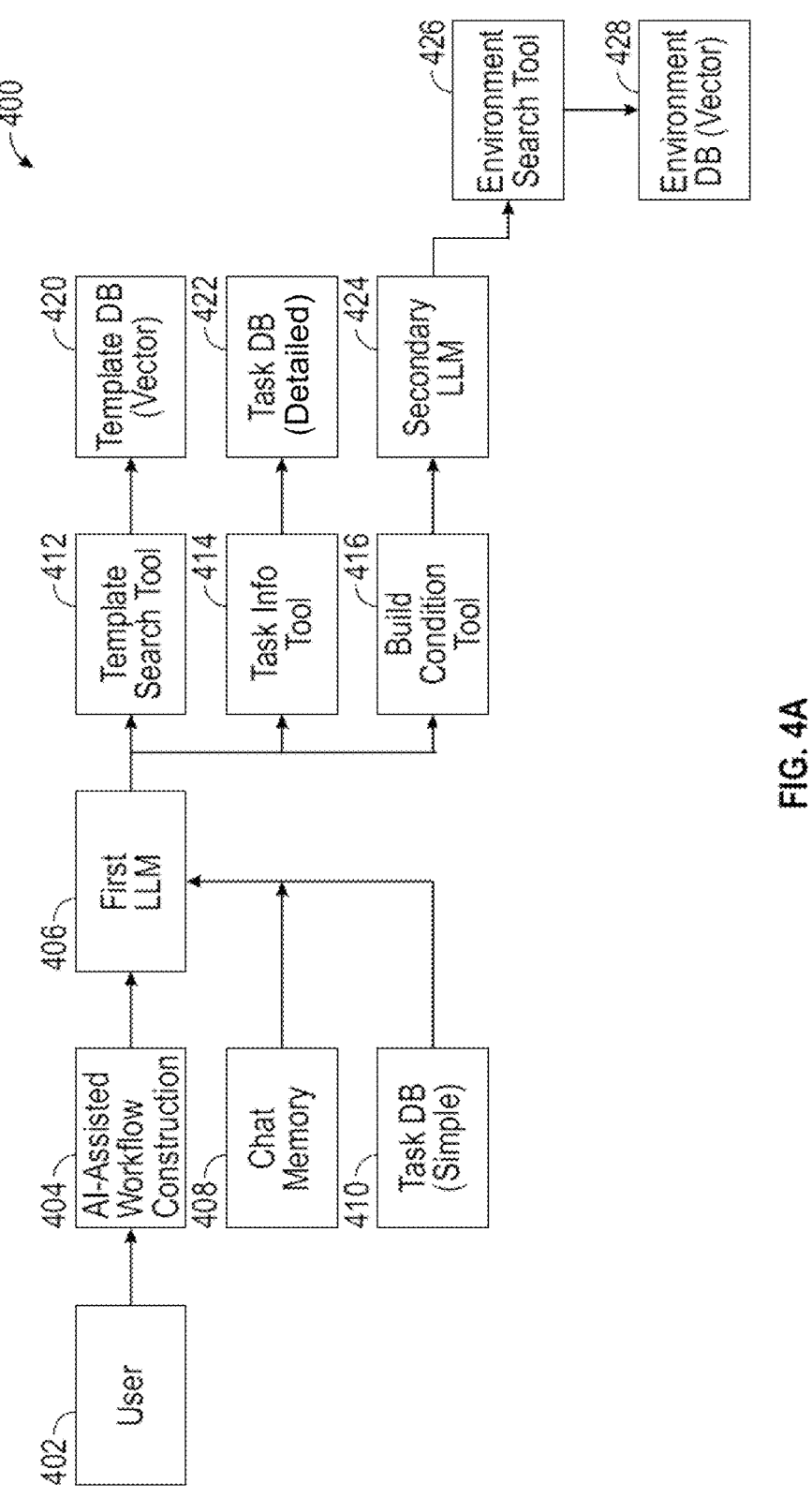
FIG. 4A shows execution steps for an AI-assisted workflow construction system, according to an embodiment.
Figure 4B:
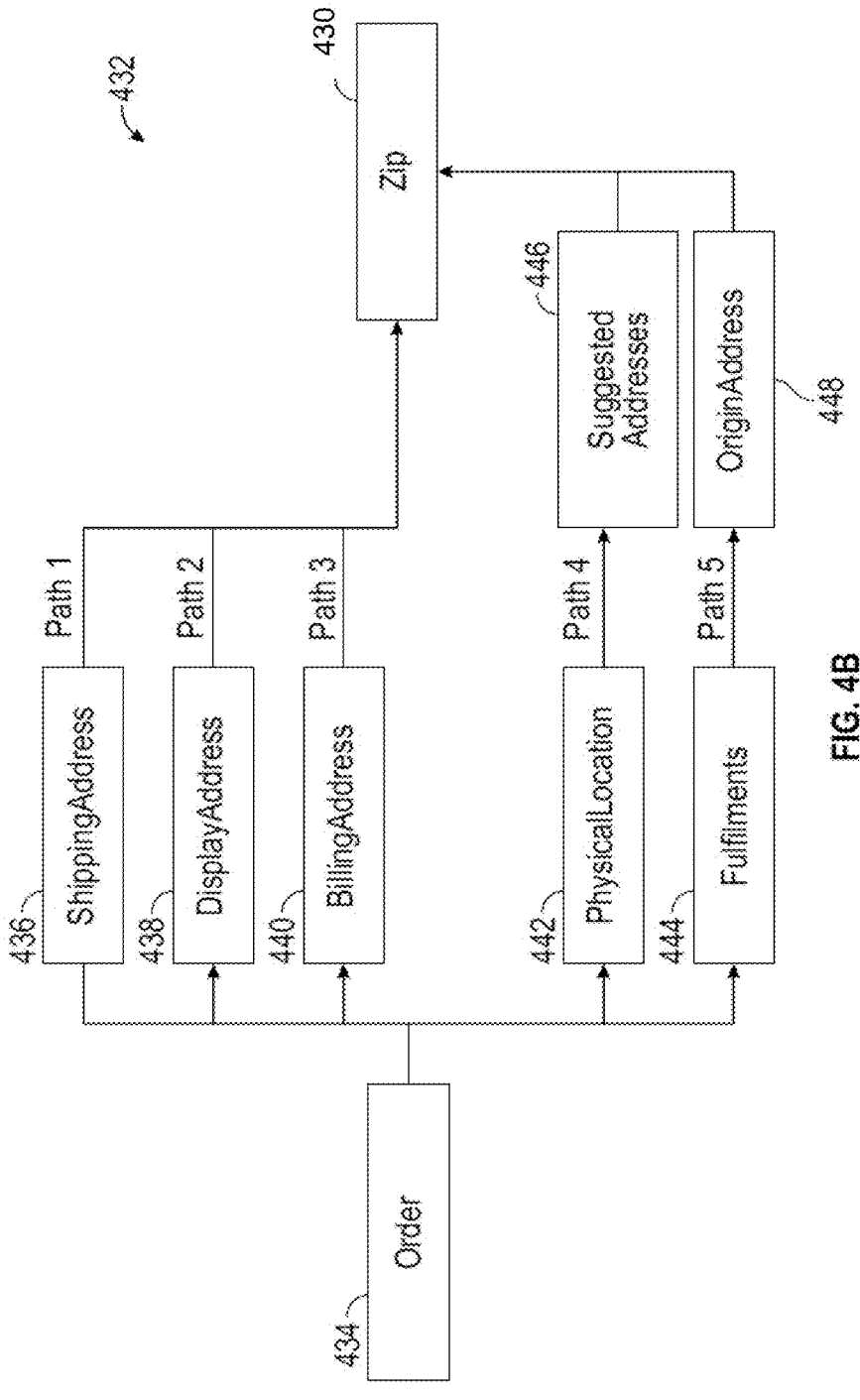
FIG. 4B shows different paths evaluated in an AI-assisted workflow construction system, according to an embodiment.
Figure 4C:
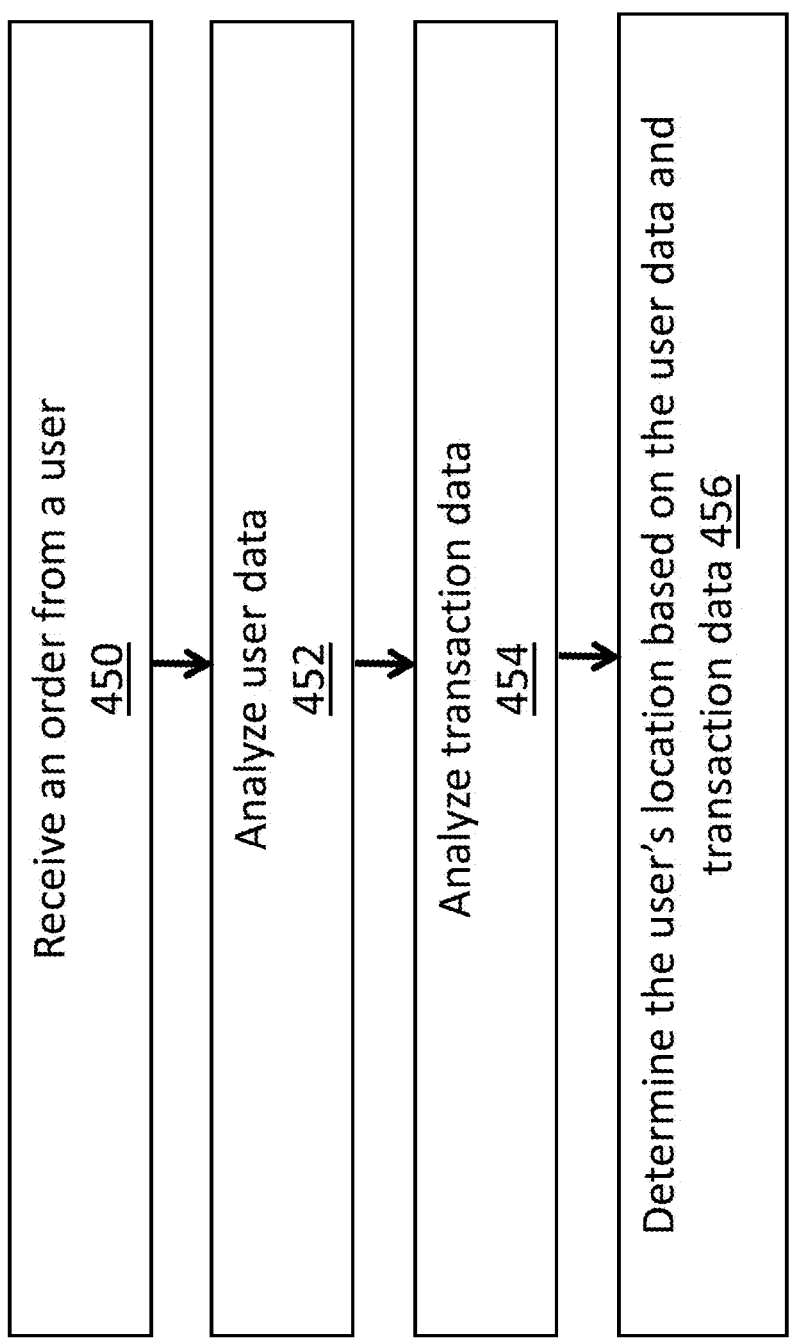
FIG. 4C shows a non-limiting example of a rudimentary workflow in an AI-assisted workflow construction system, according to an embodiment.

The workflow depicted in FIG. 4C indicates a rudimentary structure for a workflow intended to identify a location of the user. The rudimentary workflow depicted in FIG. 4C may depict the steps at a high level. In this particular example shown in FIG. 4C, the workflow includes steps of receiving an order from a user 450, analyze user data 452, analyze transaction data 454, and determine the user's location based on the user data and the transaction data 456.

A non-limiting example of a rudimentary workflow will have 2 steps: trigger+action. The trigger may refer to what event happened that caused the workflow to start (e.g. an order was created). The action may refer to some operation desired from the workflow (the action that the user expects the workflow to perform (e.g., send an email)). Alternatively, some workflows may include some conditional logic (e.g., 3 steps: trigger+condition+action).

For instance, and referring to FIG. 4C, a rudimentary workflow may be:
1. Receive an order from a user
2. Determine if the order is from California based on the user and transaction data.
3. Cancel the order since the merchant is not allowed to sell in California At step 204, the analytics server may execute a large language model, which receives an input of an intent associated with the workflow and provides a machine-readable description.

The analytics server may execute another LLM (sometimes referred to as the second LLM) using the input generated in the step 202. In some embodiments, a single LLM may act as both the first LLM and the second LLM. However, for ease of description, certain embodiments are discussed in terms of two separate LLMs, though no limitation is intended.

The second LLM may perform various actions, as depicted with respect to steps 204a-c. For instance, in step 204a, the second LLM may identify, by searching a hierarchical data structure using a vector embedding associated with the intent, an object corresponding to the intent. As described herein, the analytics server and/or the second LLM may access a hierarchical data structure that includes data associated with an entity. The data may be organized in a hierarchical or tree-like manner, such that different objects are represented by nodes/objects and dependent nodes/sub-objects. Therefore, the hierarchical data structure (sometimes referred to as the "environment" or the "environment data") may refer to properties of an entity (e.g., orders or shops). The entities like orders, shops, and/or customers may be considered as nodes in a graph, with their properties acting as edges linking to other nodes.

In some embodiments, each node within the hierarchical data structure may represent an object associated with an application programming interface (API). For instance, an API's configuration may indicate what data can be retrieved and a location from which the data can be retrieved. Moreover, each object may be connected to other sub-objects.

In some embodiments, the analytics server may first generate an embedding associated with the intent received and then perform a semantic search of the hierarchical data structure to identify the node/object that corresponds to the intent of the user. Each object/node may include a description. In some embodiments, the semantic search may determine whether the embedding (vector) associated with the intent matches (at least partially) with the description of the object/node. In some embodiments, the analytics server and/or the second LLM may iteratively traverse the hierarchy until a leaf node or object is identified.

After identifying the object in step 204a, the second LLM may identify a set of data paths within the hierarchical data structure to retrieve the identified object. The analytics server and/or the second LLM may explore the hierarchical tree to determine various sequences of steps required to reach the identified object (step 204b).

In some embodiments, the analytics server and/or the second LLM may start from a root node/object and systematically traverse through the structure using various techniques (e.g., depth-first search (DFS) or breadth-first search (BFS)) until the identified node/object is reached. In some embodiments, there may be multiple root nodes. While navigating, each choice of the parent-child relationship between different objects may represent a distinct path. The analytics server and/or the second LLM may follow these connections and record the chosen nodes at each step, thereby identifying different paths leading to the identified node/object. As described herein, the paths may vary in length and/or complexity. Therefore, at this step, all the paths may be identified. In some embodiments, the paths may be evaluated, and a suitable path may be selected (either automatically or using an AI model, such as the second LLM).

Additionally, at step 204c, the analytic server and/or the second LLM may generate a machine-readable description, the machine-readable description describing the object, and at least one data path within the set of data paths. As described with respect to FIGS. 4A-B, the analytics server may evaluate and select a path that is suitable for the workflow. In some embodiments, the analytics server may use a scoring mechanism to rank identified paths. For instance, each identified path may be scored using its corresponding attributes (e.g., semantic relevance and/or path length). In some embodiments, the analytics server may favor shorter paths for their likelihood of being more pertinent, thereby assigning a higher score to shorter paths. In some embodiments, the score may correspond to a runtime metric.

The analytics server may select a path based on a calculated runtime metric (e.g., memory usage or runtime duration) for the path. In a non-limiting example, the analytic server and/or the second LLM may identify two possible paths to retrieve the identified object. The analytic server may then select one path over the second path because the selected path has a shorter runtime (or uses less computing resources to achieve the same result).

In some embodiments, the analytics server may iteratively refine the search (using the scores), thereby enabling continuous improvement of search accuracy.

Once the path is selected, the analytics server and/or the second LLM may generate a machine-readable description of the object and the path.

At step 206, the analytics server may generate code for the workflow using the machine-readable description. The analytics server may transmit the machine-readable description (generated in step 204*c*) to the first LLM, such that the first LLM can generate a human-readable version of the machine-readable description of the workflow. The first LLM may then output the human-readable version with the user, such that the user can approve, revise, and/or deny the description. When the user approves the workflow description, a corresponding machine-readable description of the approved description may then be used to generate code associated with the workflow. For instance, the first LLM and/or the second LLM may generate the code associated with the workflow. Additionally, or alternatively, the analytics server may transmit the human-readable and/or machine-readable description to another server, such that the code is generated.

Using the method 200, the analytics server may generate workflows with blocks having diverse functionalities, such as conditions and/or multiple dependencies. Specifically, the first LLM may identify the existence of a condition, and the second LLM may determine which path can provide an optimized approach to retrieve data such that the condition can be evaluated. The method 200 is also scalable, such that multiple dependent conditional steps can be coded in the workflow. When multiple dependencies are identified, the method 200 can be iteratively performed until all blocks of the workflow have been created.

Referring now to FIG. 4A, a method 400 depicts a logical flow of how the analytics server can utilize various methods and systems (e.g., AI models) discussed herein to generate code for a workflow (e.g., machine-readable description of the workflow) based on a user's description of the workflow.

Initially, a user 402 may input a description of a workflow using a chat interface provided by an AI-assisted workflow construction (404). The AI-assisted workflow construction may transmit the input to a first LLM 406, such that the first LLM 406 identifies the intent of the input and generates a rudimentary schema for the workflow. The first LLM 406 may be trained as an assistant to help the user 402 discuss the workflow. Therefore, the first LLM 406 may engage the user 402 in a manner that is chat-like or conversation-like, where the first LLM 406 may ask questions, ingest a response, and ask additional questions. In some embodiments, this chat-like interaction with the user 402 may reduce the amount of input being analyzed by the first LLM 406, which may increase the first LLM's accuracy (e.g., the input will fit within the constraint used by the first LLM 406).

The first LLM 406 may have a chat memory layer 408 that retains information specific to the chat session and/or previous chat sessions of the user 402. The first LLM 406 may also include a task database 410 where various tasks available to be included within the workflow can be saved. As used herein, a task may define different behaviors and configurations within the workflow. In some embodiments, a condition can be defined as a type of task. In some embodiments, different tasks (included within the task database 410 and/or 422) may be used to generate steps of the workflow.

In some embodiments, detailed information about every task would exceed the limits of the first and/or second LLMs 406 and/or 424. As a result, a separate component may include detailed information about different tasks. Specifically, the task database 410 may include all possible tasks that may be used in a workflow. Therefore, the task database 410 may contain limited information about all available tasks. As also discussed herein, the task database 422 may also include more detailed information about various tasks.

A "step" may be an embodiment of a task with a specific set of configuration values specified by the user. Multiple steps may be created from the same task each with their own unique set of configuration values.

In some embodiments, the task database 410 may only include reduced information regarding tasks, such as a short name for each task. When the first LLM 406 identifies the intent of the user 402, the first LLM 406 may generate a rudimentary workflow having steps. The rudimentary workflow may omit any configuration values for the steps used within the workflow. The rudimentary workflow can be displayed for the merchant, and when the user 402 approves of the flow, various steps can be built in more detail. For instance, once the user 402 approves the steps, the first LLM 406 may start displaying questions regarding how to configure each individual step.

The first LLM 406 may use a series of tools to generate a machine-readable description of different steps within the workflow. For instance, after generating a rudimentary version of the workflow, the first LLM 406 may determine whether a step within the workflow is conditional.

In some embodiments, the first LLM 406 may attempt to generate a new workflow. However, generating a new workflow each time may be a very involved process (e.g., time-consuming and resource intensive). Moreover, this process may lead to inaccurate generation of workflows (due to various conditions and possibly misidentified steps or user intents). Therefore, the first LLM 406 may first (before attempting to generate a new workflow) attempt to determine whether the user's intent can be met by an existing template or whether an existing template can be used as a starting point for additional customization. In contrast to generating a new workflow each time, starting from an existing workflow and iterating may require less time and/or computing resources and may lead to better (more accurate) results. Moreover, the first LLM 406 may produce better results when given examples of existing reference workflows.

In some embodiments, the first LLM 406 may utilize existing templates as a starting point when generating a workflow. As used herein, a template may refer to a pre-defined and sometimes fully formed workflow. The first LLM 406 may utilize a template search tool 412 to identify whether any templates match the user's desired intent for a workflow. The first LLM 406 may revise one or more attributes of an existing template to generate the workflow.

In some embodiments, the template search tool 412 may search a template database 420 to identify pre-existing templates that correspond to the identified user intent. For instance, the analytics server may generate an embedding for the intent and search the embedding against various embeddings within the template database 420. Even if the first LLM 406 does not identify a good match after using the template search tool 412, the first LLM 406 may still benefit from using the template search tool 412 because the first LLM 406 may be exposed to several reference implementations of what "good" workflows look like (e.g., how the workflow is generated). The templates identified by the template search tool 412 may be created by humans. Therefore, the templates can be used as examples of high quality and exemplary workflows. Using this paradigm, the AI-assisted workflow construction may be able to generalize properties or attributes of these examples/templates to help it also produce future high-quality workflows.

Additionally, or alternatively, the analytics server may use a task info tool 414 to search within a task database 422 in order to identify the needed task and display the information to the user 402 (e.g., using the chat interface).

The AI-assisted workflow construction system may use two distinct versions of the task database (task database 410 and 422). In some embodiments, it may not be practical to give detailed information about every possible task to the LLM (whether first or second) without exceeding its limits. Therefore, the AI-assisted workflow construction system may provide a simplified set of information about tasks stored within the task database 410 (e.g., a list of all the task names). The models discussed herein may infer how to use the tasks based solely on their respective names. This information may be used, for instance, when planning the initial/rudimentary workflow. In contrast, the task database 422 may contain full details about all the tasks in the system, such as a more detailed description of the tasks and the exact set of configuration parameters each task accepts (e.g., names, descriptions, and types). The AI-assisted workflow construction system may provide the first LLM 406 access to the task database 422, via the task info tool 414, such that the first LLM 406 can access this task database 422 on a case-by-case basis. In some embodiments, the task database 410 helps the models (e.g., first LLM 406) identify the subset of tasks the models need to build the desired workflow. The first LLM 406 may then use the task database 422 to confirm whether the right choice has been made and to determine how to proceed with configuring various tasks.

If the task is conditional, then the analytics server may use a build condition tool 416 that uses a second LLM 424. The second LLM 424 may be trained specifically to generate all that is needed to satisfy a conditional step within the workflow. Therefore, in some embodiments, the first LLM 406 may only transmit the input (or the intent of the user 402) to the second LLM 424 when a step of the workflow involves a conditional step.

When communicating with the user and/or the LLMs (or between LLMs discussed herein), the analytics server may use a domain-specific language (DSL). In some embodiments, the analytics server may generate a DSL that can be used by the second LLM 424. The DSL can also be used by LLM 406 or either LLM could generate the DSL (or some part of it) that is then used by the analytics server. The DSL, as used herein, may refer to a syntax that can define the workflow or different steps or logical aspects of the workflow (or any steps within the workflow) in a manner that can be understood by a human.

In some embodiments, the DSL can also be understood by a machine because the DSL adheres to a schema. In some embodiments, the analytics server can use a parser to translate the workflow or condition data into its internal data structures that its code is designed to act on. Optionally, the analytics server can also use a serializer that translates in the reverse direction to ingest data stored within one of the internal data structures and converts them into the DSL format.

In some embodiments, the second LLM 424 may output the configuration for a condition as another DSL. These may be viewed as sub-steps or configuration information for the condition.

In some embodiments, AI-assisted workflow construction system may use two distinct DSLs. A first DSL may correspond to the overall workflow structure of the workflow and a second DSL may correspond to one or more conditions. In a non-limiting example, the workflow DSL may be as follows:

```
step1 = { ... }
step2 = { ... }
step1:output -> step2
```

In contrast, the condition DSL may be as follows:

```
order.paymentGatewayNames any? ( |gateway| (gateway == 'Company X'))
```

Each DSL may map to one of these data structures.

In some embodiments, the second LLM 424 may be trained based on prompt engineering (as opposed to being fine-tuned). Accordingly, the second LLM 424 can be trained using examples of DSLs. In some embodiments, the second LLM 424 can be additionally trained using a grammar description of the DSL. The second LLM 424 may then be configured to learn how to output the DSL, such that the DSL is eventually communicated back to the user.

The second LLM 424 may use an environment search tool 426 to explore the hierarchical data structure (nodal data structure or the graph) that includes various interconnected data (e.g., objects, including customers, orders, and the like). The second LLM 424 may share the workload with the environment search tool 426, such that the second LLM 424 can generate the conditional aspect/machine-readable language of the conditional step and the environment search tool 426 can search through various data paths within the nodal data structure and determine the best path for the data to be retrieved. That is, the second LLM 424 may generate a description of the data that is needed to satisfy the conditional step, and the environment search tool 426 can use the description to identify the leaf object (the node within the data that includes the data needed to satisfy the condition).

Because a vector DB and semantic search is used, the description may be a human-readable description. For instance, the second LLM 424 may generate a description of what data the second LLM 424 needs to generate the condition. The search tool 426 may then generate an embedding from this description (generated by the second LLM 424) and may use the embedding to search the environment database 428. In some embodiments, to build the environment database 428, the analytics server may generate embeddings for the nodes/edges based on human-readable descriptions. Therefore, the search tool 426 may use a similar format to search the environment database 428.

The environment search tool 426 may also identify various paths within the environment to reach the identified leaf object.

As used herein, the environment may refer to a series of connected nodes that represent the data of an entity. Each node may represent an object, and each node may include edges where dependent or otherwise associated objects (also represented as nodes) are connected. In a non-limiting example, the nodes may follow a tree-structured hierarchy (child-parent nodes) in which different objects are interconnected. Therefore, each object may have interconnected properties and/or sub-properties. The environment may represent a collection of the properties used by various programmers (e.g., API developers).

In some embodiments, the data may be represented as a directed graph data structure. In some embodiments, the data structure may also include cycles. For instance, an exemplary path 'order.customer.lastOrder' may represent an order object that links to a customer object which then links back to an order object. In some embodiment, the nodes in the graph may represent different data types. For instance, there may be only one node for an order in the graph because there may be only a single type for an order. The algorithm used for finding paths may need to detect cycles and not follow them or else it could be involved in an infinite loop.

Due to this interconnectivity, there could be multiple paths (within the environment) leading to the same object or data. The environment search tool 426 may identify the paths by searching the environment database 428. The second LLM 424 and/or the analytics server may analyze these paths. The analytics server may also generate scores for each path and identify the most suitable path or series of paths.

The analytics server may generate an embedding for various properties within the environment. In some embodiments, the second LLM 424 or another LLM may be trained to generate an embedding for each property within the environment. For instance, the analytics server and/or the second LLM 424 may concatenate the name and description of each property within the environment and use the concatenated data to generate an embedding. The embeddings may be stored within a vector database (e.g., environment DB 428).

In some embodiments, the same LLM (e.g., the second LLM 424) may not be used for generation of communication with the user and embeddings. That is, in some embodiments, the embedding may not be generated by the second LLM 424. Instead, a different model that is optimized (trained) for generation of embeddings may be used. Therefore, the embedding model may be a specialized LLM that is optimized for generation of embeddings. These models are referred to herein as the embedding model(s). In operation, an embedding model (a separate LLM not shown in FIG. 4A) may be used for embedding generation. The embedding model may be used in two separate ways. As a first non-limiting example, the embedding model is used offline to pre-populate the vector databases (e.g., the template database 420 and environment database 428). This process may be repeated to update the data stored in these databases. As a second non-limiting example, the embedding model may be used whenever a search tool is invoked (search tool 412 and/or environment search tool 426), the model may ingest the human-readable input given to the tool, generate an embedding, and then transmit the result to the vector database.

When the second LLM 424 receives the request to generate a condition, the second LLM 424 may then instruct the environment search tool 426 to identify the object needed and various applicable paths. The environment search tool 426 may generate an embedding for the request and compare the embedding with the existing (previously generated) embeddings that represent the paths within the environment (stored within the environment DC 428). Therefore, any embedding within the environment DB 428 that is semantically similar to the embedding representing the request can be identified. As a result, the second LLM 424 may receive a series of paths that correspond to the searched embedding. The identified embeddings can then be analyzed, such that their corresponding path and properties/objects (and their progressions) are identified. In some embodiments, a fuzzy matching technique may be used to compare the embeddings in which the semantic similarity between embeddings and the results are compared and ranked from best to worst. The top result might be very similar (almost an exact match) or it might be quite dissimilar (the least worst option).

In some embodiments, the AI-assisted workflow construction system may identify multiple paths that achieve the same result (e.g., lead to the same object). For instance, a refund amount may be stored within an entity database as a "merchant-created refund" and/or as a "customer-created refund." While the user 402 may not know the difference (or the difference may not be important to the user 402), the second LLM 424 may analyze both paths when identifying the most suitable path.

In some embodiments, the second LLM 424 may first identify a root node or property (e.g., the first node or property) along with the leaf node (or the end node). Subsequently, the environmental search tool 426 may perform a reverse traversal protocol to identify the best path from the root node or property to the leaf node or the end node. As used herein, the end node may represent the end result or object needed.

In some embodiments, the environmental search tool 426 may receive (1) the workflow DSL, (2) an identifier of the step being configured, and/or (3) a description of what data to search for. The environmental search tool 426 may then use the first two inputs to determine the existence of one or more upstream steps within the workflow from the step being currently configured. The environmental search tool 426 may then determine what data is returned by those upstream steps. The returned data may represent all the data that the step being configured has access to. This allows the environmental search tool 426 to determine the root nodes, as discussed herein. For example, the environmental search tool 426 can determine that step 1 and step 2 are upstream of step 3. If step 1 returns an order and step 2 returns a product, then order and product are two valid roots for searching the environment.

Referring now to FIG. 4B, an example 432, depicts how different paths can be identified by the analytics server. In the example 432, a user may use a chat interface to input "I would like to create a workflow in which VIP customers from Washington DC are identified in accordance with their amount of purchase (must be more than $500). When a customer is identified as a DC VIP customer, then I want to add a free gift to their order." The analytics server may execute the first LLM 406 to identify the sentiment and intent of the user. The first LLM 406 may generate a rudimentary workflow, having three steps.

The first step may correspond to a trigger, such as determining whether an order was created. In some embodiments, certain events must occur to trigger the workflow. For instance, an order must be created (e.g., a customer must place an order to purchase a product) for the workflow to start. The "trigger" would also be responsible for returning order data that the subsequent steps could use.

The second step may correspond to determining whether a customer lives in Washington, DC and the customer's cart includes more than $500 dollars. The first LLM 406 may then identify an existing template that corresponds to previously generated workflows. Therefore, the first step is not transmitted to the second LLM 424.

However, the first LLM 406 may not identify a suitable template for the second step. The first LLM 406 may then transmit a message to the second LLM 424, instructing the second LLM 424 to generate a suitable path to identify whether a customer lives in Washington, DC. For instance, the first LLM 406 may instruct the second LLM 424 to identify a zip code associated with the customer.

In some embodiments, the LLM 406 does not ask the second LLM 424 to generate a suitable path for whether the customer lives in Washington, DC. The LLM 406 may instead ask the second LLM 424 (via 416) to build a condition that checks if the customer lives in Washington, DC and if the order amount is more than $500. This will be a human readable description of what the condition should do. The first LLM 406 may then delegate the responsibility of figuring out how to construct a condition that meets this goal entirely to the second LLM 424. In turn, the second LLM 424 may decompose the problem further and identify what data is needed to build the condition and ask the environment search tool 426 to find this data (e.g., ask for the customer's location and the order amount). The second LLM 426 might return paths, such as 'order.customer.address.zipcode' and 'order.total' for this request. The second LLM 426 may use these paths to construct a logical expression like 'order.customer.address.zipcode==20001 && order.total>500'. The first LLM 406 would take this resulting expression and apply it to the configuration of the condition step in the overall workflow.

In some embodiments, the LLM 406 (or the analytics server using any other component discussed herein) may converse with the merchant to determine their intent, check if a template (a fully formed, pre-existing workflow) exists that matches the intent, if so, use the template and customize it as necessary. If the template is not identified, then the LLM 406 (or the analytics server using any other component discussed herein) may create a new workflow from scratch.

In some embodiments, the LLM 406 (or the analytics server) may no longer check for templates (e.g., in subsequent steps), as the templates may not be explicitly used to help build a workflow from scratch. The LLM 406 may store the results (e.g., the unsuitable templates that were found) in its conversation history. These may indirectly influence how the LLM 406 proceeds and may help the LLM 406 build a better workflow from scratch by using the stored data as reference examples. However, the LLM 406 may not explicitly invoke the template search tool 426 again.

The first LLM 406 may be trained to identify (is trained to know) that it has access to a set of tools (template search 412, task info tool 414, and build condition tool 416). The first LLM 406 may identify each tool's purpose, inputs they require, and how to generate a special message that indicates its desire to invoke one of the tools. The analytics server may inspect the output of the first LLM 406 before transmitting it back to the user. Therefore, the analytics server may determine whether the output is intended for the user or is a request to invoke one of the available tools. If the analytics server determines that the message is intended for the user, then the first LLM's output is sent back to the user without modification. If not, then the analytics server may invoke the requested tool with the requested inputs (generated by the first LLM 406). When the tool executes its assigned tasks, the analytics server transmits the tool output, adds it to the conversation history, and/or invokes the first LLM 406 again. After receiving the output of the one or more tools, the first LLM 406 ingests the result (that it originally asked to invoke) and continues its operations. The first LLM 406 may also generate yet another tool invocation request or it may generate a message to the user. This process may repeat indefinitely until the user ends their chat session or the workflow is completed.

The first LLM 406 may enquire the secondary LLM 424 (via the build condition tool 416) to configure a condition that checks if a customer lives in Washington, DC. In some embodiments, the first LLM 406 may not know about the details of how this task is actually performed by the second LLM 424. Therefore, in those embodiments, the task is completely delegated to the second LLM 424. The first LLM

406 may only provide the second LLM 424 a high-level goal without necessarily knowing how the task should be accomplished. The second LLM 424 may ingest the high-level goal and determine what logical expression to construct and what data is needed in the expression. For instance, the second LLM 406 may determine that using the customer's zip code is the ideal solution, but it doesn't know how to get this data. Therefore, the second LLM 424 provides this sub-goal of finding a path for the customer's zip code in the environment to the environment search tool 426, which then handles identifying the best possible paths as discussed herein. The second LLM 424 may evaluate the results and the descriptions associated with each to make a final selection.

In some embodiments, the second LLM 424 may determine that the customer's zip code must be analyzed. As a result, the analytics server may generate an embedding for the term "zip code," as the zip code is the end result that is needed. The analytics server (e.g., via the environment search tool 426) may then conduct a vector similarity search to identify the most semantically similar object within the environment database 428. The result is depicted in example 432 as the "leaf node" 430, which represents the node that contains the data needed to satisfy the request. Therefore, in this example, the root object is the node 434 (order), and the leaf object is the node 430 (zip code).

By reverse traversing from the node 430 to the node 434, the analytics server may identify five different paths to ultimately reach the leaf node 430, as depicted in FIG. 4B. After identifying the needed paths, the analytics server may evaluate each path and generate a score for each path. The score may correspond to how suitable each path is with respect to satisfying the request for the workflow step.

The analytics server may use various rules to generate the score. In one example, a number of intermediary nodes/objects within a path may be used to generate a score for that path. For instance, the analytics server may determine that the shortest path containing the least number of intermediary objects is or should be ranked higher than another path that includes more objects. In another example, a runtime metric associated with each path may be used to generate a score for the identified paths. For instance, executing the steps required by each path may require computing resources and the analytics server may favor the path that requires less resources (e.g., in some cases, shorter paths require fewer computing resources).

The analytics server may rank each path in accordance with their respective score. Then, the analytics server may select the top three (or any other number as input by a system administrator) based on their respective score. The analytics server may then display the top three options to the user and receive a selection from the user.

Additionally, or alternatively, the second LLM 424 may be used to rank the paths and/or to select the most suitable path to satisfy the request. In another example, the analytics server may use the description of each object in the path to create a summary of the path. Once all possible paths are summarized, the second LLM 424 (or another LLM) may be instructed to pick the most relevant path. In some embodiments, a schema definition language (SDL) associated with each path may be retrieved. The SDL may identify which subset of the data is used in reaching the end result. For instance, node 436 may be connected to more nodes than just the node representing zip codes (e.g., street addresses and/or apartment numbers). These additional nodes are not shown in FIG. 4B for clarity. However, not all the data can be or needs to be retrieved. For instance, only the zip code is needed to be retrieved (and not the street address).

Therefore, the SDL may indicate which subset of the data is used in addition to different nodes along each path (e.g., metadata information of different nodes that are included within a path).

In some embodiments, the SDL shows a view of the environment with all (or some of the) nodes and edges not relevant to the identified paths removed. This way, the original metadata and relationships between the nodes and edges on the paths may be preserved but the amount of data required to express this view is dramatically less than the data for the full environment. This compact format allows the LLM to see just the part of the environment that is relevant to the problem it's solving without exceeding its limits with regards to how much data it can act on. If multiple paths are identified that end up traversing through the same nodes, then the SDL representation can end up being more compact than returning a list of paths because nodes are not repeated in SDL but they can be repeated in a simple list of paths. Also, a simple list of paths may not be able to capture all the metadata (e.g., descriptions) of each node in the path.

In some embodiments, the second LLM 424 may be trained using historical SDLs such that it can ingest new SDLs for different candidate paths and select the most suitable path. For instance, the second LLM 424 may identify the most suitable path based on the semantic similarity (sometimes weighted, e.g., the semantic similarity of the end node may be weighted higher than intermediate nodes) of different nodes within a path. In another example, a particular path may be boosted in accordance with the user's historical selection (e.g., the popularity of a particular path).

The third step of the workflow may correspond to adding a free gift to the customer's electronic cart.

Referring back to FIG. 4B, the analytics server analyzes each path and eliminates paths 4 and 5 because they include more than one intermediary objects. Then, it ranks paths 1-3 in accordance with their respective summaries (SDLs). The analytics server may then present the options (paths 1-3) to the user. For instance, the second LLM 424 may transmit an indication of each path to the first LLM 406 where the first LLMs 406 uses a chat interface to communicate with the user. For instance, the first LLM 406 may preset the following to the user:

"Would you like to identify the customer's residence via their shipping address or their billing address?"

In this example, only the top two options (Paths 1 and 3) are presented to the user. This may be because Path 2 is eliminated based on its summary (e.g., by the second LLM 424). The user can then respond to the question in natural language (e.g., "use the billing address").

Once the suitable path is identified (via the user or automatically), the second LLM 424 may generate a script (e.g., DSL) that can be used to generate code associated with the desired step of the workflow. The machine-readable script can include instructions regarding which path to use to satisfy a particular step of the workflow. For instance, in the non-limiting example 432, the second LLM 424 may transmit machine-readable code associated with Path 3 along with any other information needed to generate the second step of the workflow to the first LLM 406. The first LLM 406 may then aggregate the information associated with all the steps of the workflow. The analytics server and/or the first LLM 406 may then generate code associated with the workflow using the aggregated workflow data.

A non-limiting example of the DSL may be the following:

```
"Some description of an order"
type Order {
"Some description of a shipping address"
shippingAddress: Address
displayAddress: Address
billingAddress: Address
physicalLocation: Location
fulfillments: [Fulfillments]
}
type Address {
zip: String
}
type Location {
suggestedAddresses: [Address]
}
type Fulfillment {
originAddress: Address
}
...
```

The SDL may capture the graph structure of the data and each node and edge can have its own description. In contrast to the following flat list of paths, the DSL may convey much more information:

```
...
order.shippingAddress.zip
order.displayAddress.zip
order.billingAddress.zip
order.physicalLocation.suggestedAddresses.zip
order.fulfillments.originAddress.zip
```

Referring now to FIGS. 5A-C, a non-limiting example of an interaction between the analytics server (using the methods and systems described herein) and a user is depicted. In the depicted non-limiting example, a user accesses a chat interface provided by the analytics server, as depicted in the interface 500. The user may input "I want to handle orders from Company X." The input may be received and analyzed by the first LLM. The first LLM may then use the chat interface to display a response to the user. The first LLM may also inquire about the details of the request. For instance, as depicted within the interface 500, the first LLM may ask the user whether the user desires to tag the orders from Company X, send an email notification, and/or perform some other action.

The analytics server may then present an input element, e.g., a text box within the chat interface, allowing the user to respond to the question presented by the first LLM. As depicted within an interface 502, the user instructs the analytics server to send an email and tag the orders (associated with or otherwise handled/facilitated by Company X).

As discussed herein, the first LLM may then search within a template database (e.g., template DB 420) to identify an existent template for a workflow requesting similar information. In some embodiments, the analytics server may generate embeddings for different templates and store them as vectors/embeddings within the template DB 420. However, the analytics server may not identify an existing template. As a result, the first LLM displays the message 504, informing the user that a template cannot be found.

The first LLM may then generate a rudimentary description of the steps necessary to satisfy the user's request. As a result, the first LLM displays the message 506. Using the methods discussed herein, the first LLM may then generate the DSL displayed within the message 508. In some embodiments, instead of providing the DSL for the steps of the requested workflow (e.g., "Step 1: Output>Step 2"), the analytics server may output a visual depiction of different steps (e.g., a visual diagram). Therefore, the message 508 provides a description of the steps and includes a depiction of how the steps should be connected.

The first LLM may also provide a plain English description of the workflow (e.g., the message 510) and inquire whether the user is interested in the described workflow. If the user answers in the affirmative, then the analytics server may proceed to the interface 512 and display the objects needed to be included, e.g., message 514. The first LLM may communicate with the second LLM and transmit the rudimentary workflow to the second LLM, such that the second LLM can search the environment and identify paths and objects needed to generate the condition for the workflow. The message 514 displays the objects (within the graph or the environment) that need to be queried (or otherwise used) and the logical expression that uses these objects to generate the requested condition. For instance, the message 514 indicates that the second step of the workflow can be represented by the following string (DSL):

order.paymentGatewayNames    any?    (|gateway| (gateway=='Company X')).

In this example, the path may be represented by "order-.paymentGateNames." The rest of the string may correspond to a logical expression that loops over all the gateway names (since it is an array) and checks if any of the names in the array are equal to "Company X." Conditions are configured with a logical expression. These expressions may contain paths that reference data returned by upstream steps. When the expression is evaluated, the value of the referenced data is substituted. In some embodiments, the final result of the expression is true or false (boolean expression), which is used to implement branching logic within the workflow.

Example Machine Learning Operations

To assist in understanding the present disclosure, some example concepts relevant to neural networks and machine learning (ML) are further discussed.

Generally, a neural network comprises a number of computation units (sometimes referred to as "neurons"). Each neuron receives an input value and applies a function to the input value to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus may be created by extracting text from online webpages and/or publicly available social media posts. In another example, to train a ML model that is intended to classify images, the training dataset may be a collection of images. Training data may be annotated with ground truth labels (e.g., each data entry in the training dataset may be paired with a label) or may be unlabeled.

Training a ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

Figure 6A:
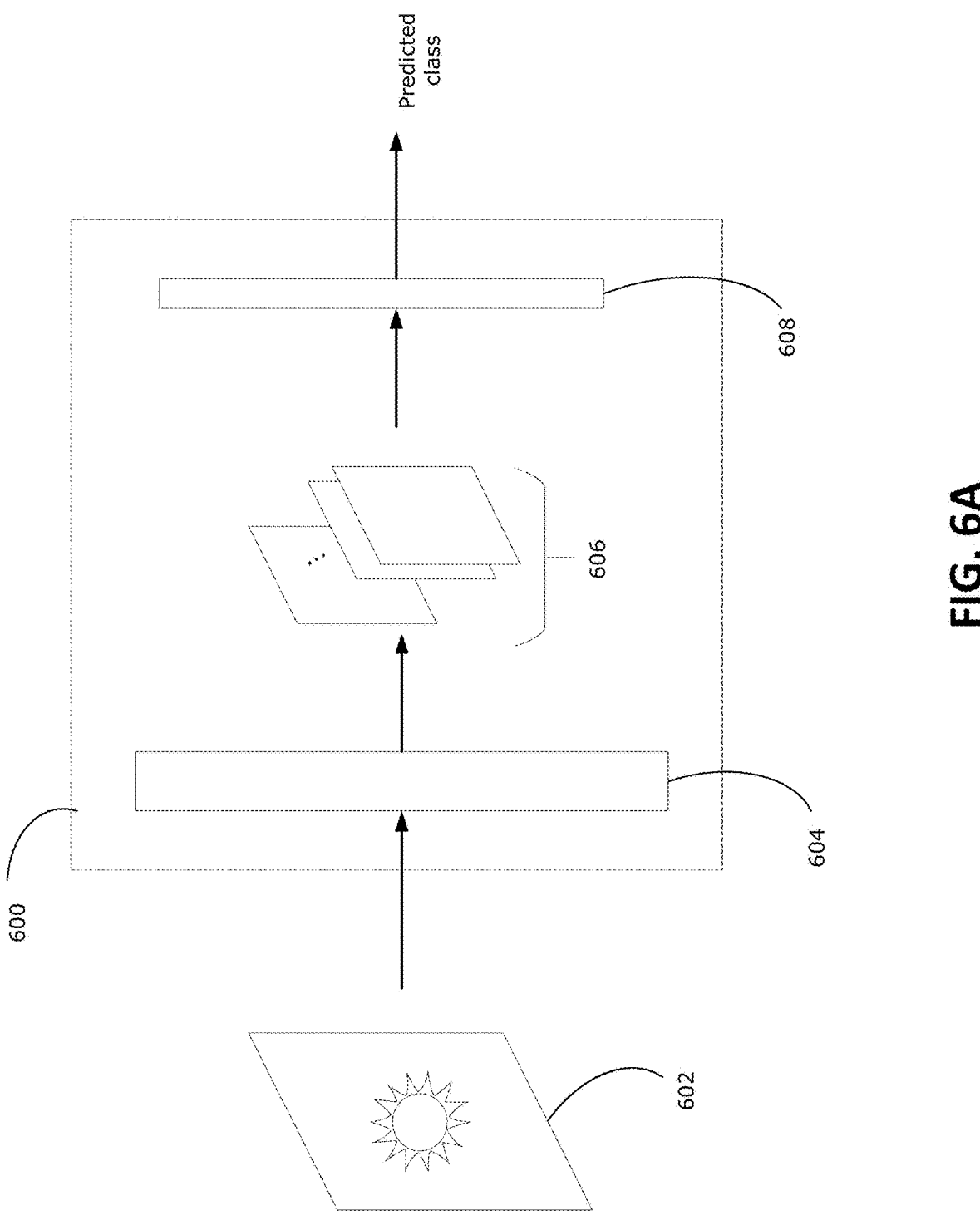
FIG. 6A shows a block diagram of a simplified convolutional neural network, which may be used in examples of the present disclosure.

FIG. 6A shows a block diagram of a simplified convolutional neural network which may be used in examples of the present disclosure. Specifically, an example CNN 600 is shown, which is an example of a DNN that is commonly used for image processing tasks such as image classification, image analysis, object segmentation, etc. An input to the CNN 600 may be an image 602 (e.g., 2D color image). While a 2D image is illustrated by FIG. 6A, it will be understood that CNN 600 may be trained to process data associated with other types of information such as, for example, words or sets of words corresponding to word embeddings and/or the like.

The CNN 600 includes a plurality of layers that process the image 602 in order to generate an output, such as a predicted classification or predicted label for the image 602. For simplicity, only a few layers of the CNN 600 are illustrated including at least one convolutional layer 604. The convolutional layer 604 performs convolution processing, which may involve computing a dot product between the input to the convolutional layer 604 and a convolution kernel. A convolutional kernel is typically a 2D matrix of learned parameters that is executed to the input in order to extract image features. Different convolutional kernels may be executed to extract different image information, such as shape information, color information, etc.

The output of the convolution layer 604 is a set of feature maps 606 (sometimes referred to as activation maps). Each feature map 606 generally has smaller width and height than the image 602. The set of feature maps 606 encode image features that may be processed by subsequent layers of the CNN 600, depending on the design and intended task for the CNN 600. In this example, a fully connected layer 608 processes the set of feature maps 606 in order to perform a classification of the image, based on the features encoded in the set of feature maps 606. The fully connected layer 608 contains learned parameters that, when executed to the set of feature maps 606, outputs a set of probabilities representing the likelihood that the image 602 belongs to each of a defined set of possible classes. The class having the highest probability may then be outputted as the predicted classification for the image 602.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (e.g., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (e.g., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 6B:
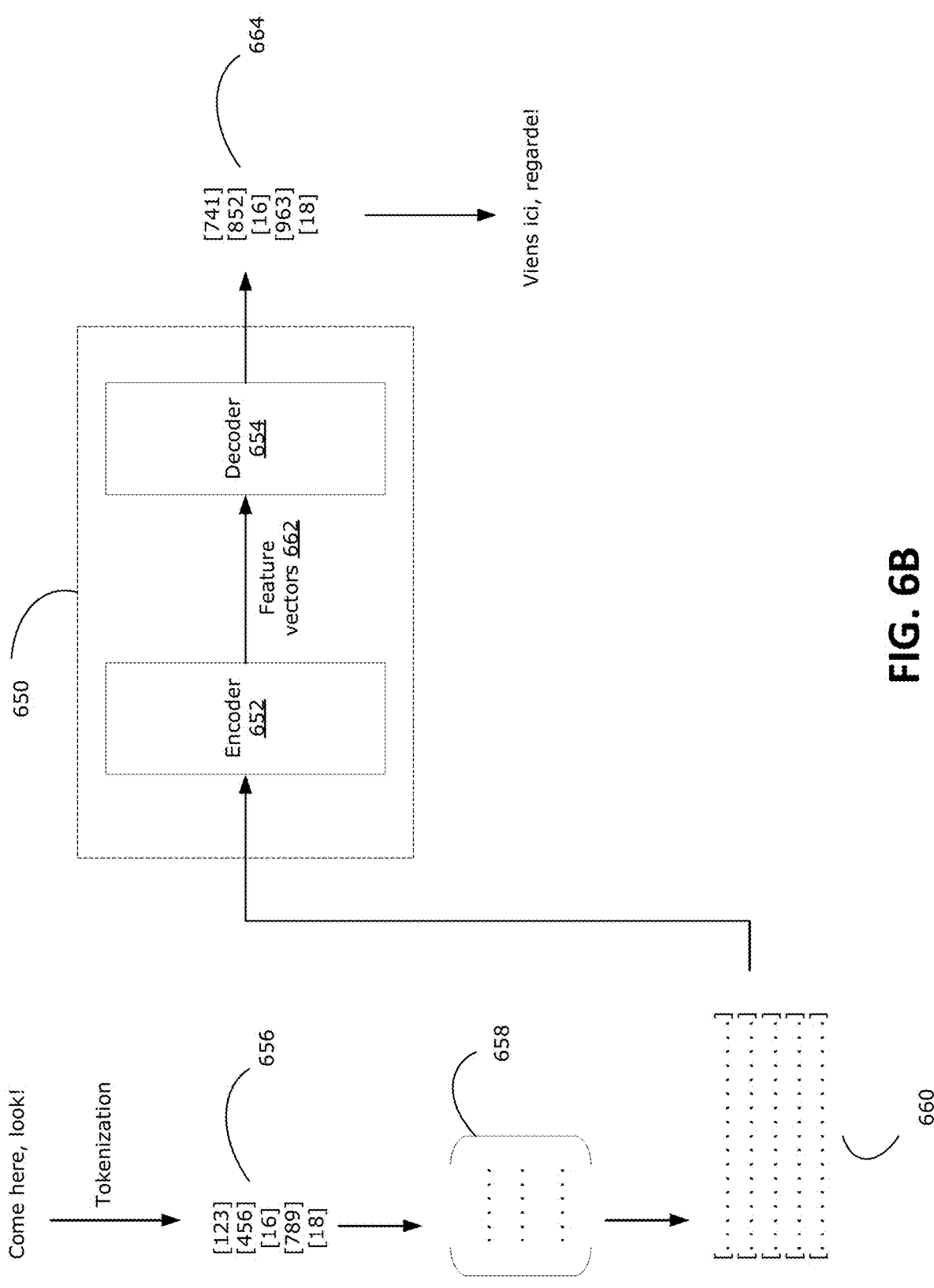
FIG. 6B shows a block diagram of a simplified transformer neural network, which may be used in examples of the present disclosure.

FIG. 6B shows a block diagram of a simplified transformer neural network which may be used in examples of the present disclosure. The diagram includes an example transformer 650, and a simplified discussion of its operation is now provided. The transformer 650 includes an encoder 652 (which may comprise one or more encoder layers/blocks connected in series) and a decoder 654 (which may comprise one or more decoder layers/blocks connected in series). Generally, the encoder 652 and the decoder 654 each include a plurality of neural network layers, at least one of which may be a self-attention layer. The parameters of the neural network layers may be referred to as the parameters of the language model.

The transformer 650 may be trained on a text corpus that is labeled (e.g., annotated to indicate verbs, nouns, etc.) or unlabeled. LLMs may be trained on a large unlabeled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 650 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 6B, a short sequence of tokens 656 corresponding to the text sequence "Come here, look!" is illustrated as input to the transformer 650. While the example "Come here, look!" is provided as an example, it will be understood that the customer input data and/or the agent input data described with respect to FIG. 7 (including portions thereof) and/or data associated with transcripts (including portions thereof) may be provided to the transformer 650 to cause the transformer 650 to generate an output based on the data provided the transformer 650. Additionally, or alternatively, data associated with prompts and/or summaries described with respect to FIG. 7 may also be provided to the transformer 650 to generate the outputs described above with respect to FIG. 7.

With continued reference to FIG. 6B, tokenization of the text sequence into the tokens 656 may be performed by some pre-processing tokenization module such as, for example, a byte pair encoding tokenizer (the "pre" referring to the tokenization occurring prior to the processing of the tokenized input by the LLM), which is not shown in FIG. 6B for simplicity. In general, the token sequence that is inputted to the transformer 650 may be of any length up to a maximum length defined based on the dimensions of the transformer 650 (e.g., such a limit may be 2048 tokens in some LLMs). Each token 656 in the token sequence is converted into an embedding vector 660 (also referred to simply as an embedding). An embedding 660 is a learned numerical representation (such as, for example, a vector) of a token that captures some semantic meaning of the text segment represented by the token 656. The embedding 660 represents the text segment corresponding to the token 656 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 660 corresponding to the "look" token will be closer to another embedding corresponding to the "see" token in the vector space, as compared to the distance between the embedding 660 corresponding to the "look" token and another embedding corresponding to the "cake" token. The vector space may be defined by the dimensions and values of the embedding vectors. Various techniques may be used to convert a token 656 to an embedding 660. For example, another trained ML model may be used to convert the token 656 into an embedding 660. In particular, another trained ML model may be used to convert the token 656 into an embedding 660 in a way that encodes additional information into the embedding 660 (e.g., a trained ML model may encode positional information about the position of the token 656 in the text sequence into the embedding 660). In some examples, the numerical value of the token 656 may be used to look up the corresponding embedding in an embedding matrix 658 (which may be learned during training of the transformer 650).

The generated embeddings 660 are input into the encoder 652. The encoder 652 serves to encode the embeddings 660 into feature vectors 662 that represent the latent features of the embeddings 660. The encoder 652 may encode positional information (e.g., information about the sequence of the input) in the feature vectors 662. The feature vectors 662 may have very high dimensionality (e.g., on the order of thousands or tens of thousands), with each element in a feature vector 662 corresponding to a respective feature. The numerical weight of each element in a feature vector 662 represents the importance of the corresponding feature. The space of all possible feature vectors 662 that can be generated by the encoder 652 may be referred to as the latent space or feature space.

Conceptually, the decoder 654 is designed to map the features represented by the feature vectors 662 into meaningful output, which may depend on the task that was assigned to the transformer 650. For example, if the transformer 650 is used for a translation task, the decoder 354 may map the feature vectors 662 into text output in a target language different from the language of the original tokens 656. Generally, in a generative language model, the decoder 654 serves to decode the feature vectors 662 into a sequence of tokens. The decoder 654 may generate output tokens 664 one by one. Each output token 664 may be fed back as input to the decoder 654 in order to generate the next output token 664. By feeding back the generated output and applying self-attention, the decoder 654 is able to generate a sequence of output tokens 664 that has sequential meaning (e.g., the resulting output text sequence is understandable as a sentence and obeys grammatical rules). The decoder 654 may generate output tokens 664 until a special [EOT] token (indicating the end of the text) is generated. The resulting sequence of output tokens 664 may then be converted to a text sequence in post-processing. For example, each output token 664 may be an integer number that corresponds to a vocabulary index. By looking up the text segment using the vocabulary index, the text segment corresponding to each output token 664 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally, or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally, or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 7:
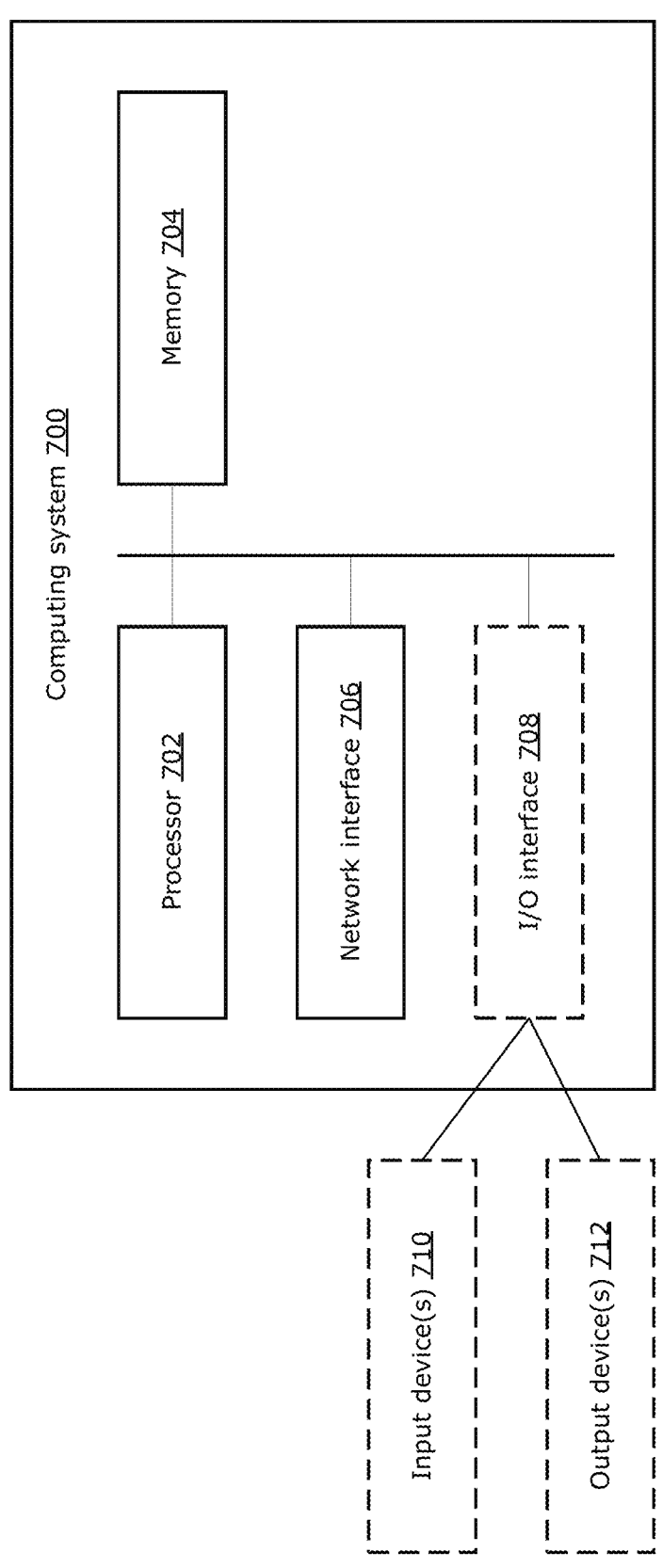
FIG. 7 shows a block diagram of an example computing system that may be used to implement examples of the present disclosure.

FIG. 7 shows a block diagram of an example computing system which may be used to implement examples of the present disclosure. The example computing system 700, which may be used to implement examples of the present disclosure, such as a prompt generation engine to generate prompts to be provided as input to a language model such as an LLM. Additionally, or alternatively, one or more instances of the example computing system 700 may be employed to execute the LLM. For example, a plurality of instances of the example computing system 700 may cooperate to provide output using an LLM in manners as discussed above.

The example computing system 700 includes at least one processing unit, such as a processor 702, and at least one physical memory 704. The processor 702 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 704 may include a volatile or non-volatile memory (e.g., a flash memory, a random access memory (RAM), and/or a read-only memory (ROM)). The memory 704 may store instructions for execution by the processor 702, to the computing system 700 to carry out examples of the methods, functionalities, systems and modules disclosed herein.

The computing system 700 may also include at least one network interface 706 for wired and/or wireless communications with an external system and/or network (e.g., an intranet, the Internet, a P2P network, a WAN and/or a LAN). A network interface may enable the computing system 700 to carry out communications (e.g., wireless communications) with systems external to the computing system 700, such as a language model residing on a remote system.

The computing system 700 may optionally include at least one input/output (I/O) interface 708, which may interface with optional input device(s) 710 and/or optional output device(s) 712. Input device(s) 710 may include, for example, buttons, a microphone, a touchscreen, a keyboard, etc. Output device(s) 712 may include, for example, a display, a speaker, etc. In this example, optional input device(s) 710 and optional output device(s) 712 are shown external to the computing system 700. In other examples, one or more of the input device(s) 710 and/or output device(s) 712 may be an internal component of the computing system 700.

A computing system, such as the computing system 700 of FIG. 7, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Using the methods and systems discussed herein, a server/processor may use a combination LLMs to generate code associated with a workflow. In one embodiment, a method comprises executing, by a processor, a large language model, which receives an input of an intent associated with a workflow and provides a machine-readable description by: identifying, by searching a hierarchical data structure using a vector embedding associated with the intent, an object corresponding to the intent; identifying a set of data paths within the hierarchical data structure to retrieve the identified object; and generating the machine-readable description, the machine-readable description describing the object and at least one data path within the set of data paths; and generating, by the processor, code for the workflow using the machine-readable description.

The method may further comprise executing, by the processor, a second large language model to identify the intent using the input.

The at least one data path may be selected from the set of data paths using a runtime metric associated with the at least one data path.

The at least one data path may be selected from the set of data paths using a number of objects associated with the at least one data path.

The method may further comprise generating, by the processor using the large language model, a summary for each path within the set of data paths; and selecting, by the processor, the at least one data path in accordance with a corresponding summary.

The object may have a description within the hierarchical data structure that is semantically similar to the intent.

The method may further comprise rendering, by the processor, a visual representation of the workflow.

The workflow may have a conditional step.

In another embodiment, a computer system may comprise a server comprising a processor configured to: execute a large language model, which receives an input of an intent associated with a workflow and provides a machine-readable description by: identifying, by searching a hierarchical data structure using a vector embedding associated with the intent, an object corresponding to the intent; identifying a set of data paths within the hierarchical data structure to retrieve the identified object; and generating the machine-readable description, the machine-readable description describing the object and at least one data path within the set of data paths; and generate code for the workflow using the machine-readable description.

The server may be further configured to execute a second large language model to identify the intent using the input.

The at least one data path may be selected from the set of data paths using a runtime metric associated with the at least one data path.

The at least one data path may be selected from the set of data paths using a number of objects associated with the at least one data path.

The server may be further configured to: generate, using the large language model, a summary for each path within the set of data paths; and select the at least one data path in accordance with a corresponding summary.

The object may have a description within the hierarchical data structure that is semantically similar to the intent.

The server may be further configured to render a visual representation of the workflow.

The workflow may have a conditional step.

In yet another embodiment, a non-transitory machine-readable storage medium has instructions stored thereon that, when executed by one or more processors, cause the one or more processors to: execute a large language model, which receives an input of an intent associated with a workflow and provides a machine-readable description by: identifying, by searching a hierarchical data structure using a vector embedding associated with the intent, an object corresponding to the intent; identifying a set of data paths within the hierarchical data structure to retrieve the identified object; and generating the machine-readable description, the machine-readable description describing the object and at least one data path within the set of data paths; and generate code for the workflow using the machine-readable description.

The instructions may further cause the one or more processors to execute a second large language model to identify the intent using the input.

The at least one data path may be selected from the set of data paths using a runtime metric associated with the at least one data path.

The at least one data path may be selected from the set of data paths using a number of objects associated with the at least one data path.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc., are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

As used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open ended terms. Further, the phrase "based on" is intended to mean "based at least partially on" unless explicitly stated otherwise.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
executing, by a processor, a large language model, which receives an input of an intent associated with a workflow and provides a machine-readable description by:
identifying, by searching a hierarchical data structure using a vector embedding associated with the intent, an object corresponding to the intent;
identifying a set of data paths within the hierarchical data structure to retrieve the identified object; and
generating the machine-readable description, the machine-readable description describing the object and at least one data path within the set of data paths; and
generating, by the processor, code for the workflow using the machine-readable description.

2. The method of claim 1, further comprising:
executing, by the processor, a second large language model to identify the intent using the input.

3. The method of claim 1, wherein the at least one data path is selected from the set of data paths using a runtime metric associated with the at least one data path.

4. The method of claim 1, wherein the at least one data path is selected from the set of data paths using a number of objects associated with the at least one data path.

5. The method of claim 1, further comprising:

generating, by the processor using the large language model, a summary for each path within the set of data paths; and selecting, by the processor, the at least one data path in accordance with a corresponding summary.

6. The method of claim 1, wherein the object has a description within the hierarchical data structure that is semantically similar to the intent.

7. The method of claim 1, further comprising:

rendering, by the processor, a visual representation of the workflow.

8. The method of claim 1, wherein the workflow has a conditional step.

9. A computer system comprising:

a server comprising a processor configured to:

execute a large language model, which receives an input of an intent associated with a workflow and provides a machine-readable description by:

identifying, by searching a hierarchical data structure using a vector embedding associated with the intent, an object corresponding to the intent;

identifying a set of data paths within the hierarchical data structure to retrieve the identified object; and generating the machine-readable description, the machine-readable description describing the object and at least one data path within the set of data paths; and generate code for the workflow using the machine-readable description.

10. The computer system of claim 9, wherein the server is further configured to execute a second large language model to identify the intent using the input.

11. The computer system of claim 9, wherein the at least one data path is selected from the set of data paths using a runtime metric associated with the at least one data path.

12. The computer system of claim 9, wherein the at least one data path is selected from the set of data paths using a number of objects associated with the at least one data path.

13. The computer system of claim 9, wherein the server is further configured to:

generate, using the large language model, a summary for each path within the set of data paths; and select the at least one data path in accordance with a corresponding summary.

14. The computer system of claim 9, wherein the object has a description within the hierarchical data structure that is semantically similar to the intent.

15. The computer system of claim 9, wherein the server is further configured to render a visual representation of the workflow.

16. The computer system of claim 9, wherein the workflow has a conditional step.

17. A non-transitory machine-readable storage medium having instructions stored thereon that, when executed by one or more processors, cause the one or more processors to:

execute a large language model, which receives an input of an intent associated with a workflow and provides a machine-readable description by:

identifying, by searching a hierarchical data structure using a vector embedding associated with the intent, an object corresponding to the intent;

identifying a set of data paths within the hierarchical data structure to retrieve the identified object; and generating the machine-readable description, the machine-readable description describing the object and at least one data path within the set of data paths; and generate code for the workflow using the machine-readable description.

18. The non-transitory machine-readable storage medium of claim 17, wherein the instructions further cause the one or more processors to execute a second large language model to identify the intent using the input.

19. The non-transitory machine-readable storage medium of claim 17, wherein the at least one data path is selected from the set of data paths using a runtime metric associated with the at least one data path.

20. The non-transitory machine-readable storage medium of claim 17, wherein the at least one data path is selected from the set of data paths using a number of objects associated with the at least one data path.

* * * * *